United States Patent
Chu et al.

(10) Patent No.: US 11,457,165 B2
(45) Date of Patent: Sep. 27, 2022

(54) PIXEL ARRAY AND IMAGE SENSOR INCLUDING THE SAME

(71) Applicant: SAMSUNG ELECTRONICS CO., LTD., Suwon-si (KR)

(72) Inventors: Myunglae Chu, Hwaseong-si (KR); Gwideok Ryan Lee, Hwaseong-si (KR); Taeyon Lee, Seoul (KR); Jaehoon Jeon, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/237,843

(22) Filed: Apr. 22, 2021

(65) Prior Publication Data
US 2021/0337155 A1    Oct. 28, 2021

(30) Foreign Application Priority Data
Apr. 24, 2020 (KR) .................. 10-2020-0050345

(51) Int. Cl.
| | |
|---|---|
| H04N 5/225 | (2006.01) |
| H04N 5/232 | (2006.01) |
| H04N 5/369 | (2011.01) |
| H04N 5/335 | (2011.01) |
| H04N 5/374 | (2011.01) |
| H01L 27/146 | (2006.01) |
| H04N 5/3745 | (2011.01) |
| H04N 5/378 | (2011.01) |

(52) U.S. Cl.
CPC ......... *H04N 5/3745* (2013.01); *H04N 5/378* (2013.01)

(58) Field of Classification Search
None
See application file for complete search history.

(56) References Cited

U.S. PATENT DOCUMENTS

| | | |
|---|---|---|
| 6,493,030 B1 | 12/2002 | Kozlowski et al. |
| 6,697,111 B1 | 2/2004 | Kozlowski et al. |
| 7,224,390 B2 | 5/2007 | Kokubun et al. |
| 9,456,159 B1 | 9/2016 | Hynecek |
| 9,942,502 B2 | 4/2018 | Borremans |
| 10,104,322 B2 | 10/2018 | Mandelli et al. |

(Continued)

FOREIGN PATENT DOCUMENTS

| | | |
|---|---|---|
| JP | 2012-114838 A | 6/2012 |
| JP | 2013-30820 A | 2/2013 |

OTHER PUBLICATIONS

"Panasonic Develops Industry's-First*1 8K High-Resolution, High-Performance Global Shutter Technology using Organic-Photoconductive-Film CMOS Image Sensor" Panasonic Corporation, Feb. 14, 2018, http://www.panasonic.com/global, pp. 1-7 (7 pages total).

*Primary Examiner* — Mark T Monk
(74) *Attorney, Agent, or Firm* — Sughrue Mion, PLLC

(57) ABSTRACT

A pixel array and an image sensor are provided. The image sensor includes a substrate, a pixel array of pixels, each pixel including a pixel circuit and a pixel conversion device. The pixel circuit is formed in a pixel area corresponding to the pixel in the substrate. The pixel conversion device is arranged on the substrate to vertically overlap the pixel circuit. The pixel circuit includes a floating diffusion node, a reset switching device, and an amplifier including a load device and a plurality of switching devices, the load device being arranged in the pixel area.

20 Claims, 25 Drawing Sheets

(56) References Cited

U.S. PATENT DOCUMENTS 10,225,500 B2 * 3/2019 Yanagida ............... H04N 5/363
10,325,945 B2 6/2019 Murakami et al.
10,341,591 B2 7/2019 Hirase et al.

* cited by examiner

PIXEL ARRAY AND IMAGE SENSOR INCLUDING THE SAME

CROSS-REFERENCE TO RELATED APPLICATION

This application claims priority from Korean Patent Application No. 10-2020-0050345, filed on Apr. 24, 2020, in the Korean Intellectual Property Office, the disclosure of which is incorporated by reference herein in its entirety.

BACKGROUND

1. Field

Apparatuses and devices consistent with the present disclosure relate to a pixel array and an image sensor including the pixel array and, more particularly, to a pixel array including a plurality of pixels, each performing a feedback reset, and an image sensor including the pixel array.

2. Description of Related Art

Image sensors are devices for capturing 2-dimensional or 3-dimensional images of objects. Image sensors generate images of objects by using photosensitive devices responding according to the intensity of light reflected by the objects. Recently, according to the development of complementary metal-oxide semiconductor (CMOS) technology, CMOS image sensors using CMOS have been widely used.

SUMMARY

It is an aspect to provide a pixel array capable of reducing reset noise and reset time and an image sensor including the pixel array.

According to an aspect of an example embodiment, there is provided an image sensor comprising a plurality of pixels arranged in a matrix form and converting a light signal into an electrical signal, each of the plurality of pixels comprising a photoelectric conversion device configured to convert the light signal into electric charges; a floating diffusion node, which is connected to the photoelectric conversion device and stores the electric charges; an amplifier configured to inversion-amplify a voltage of the floating diffusion node, output, in a reset period, a first output signal through a first node based on the inversion-amplified voltage, and output, in a signal output period, a second output signal through a second node different from the first node based on the inversion-amplified voltage; and a reset switching device configured to be turned on in the reset period and provide the first output signal of the amplifier to the floating diffusion node, wherein the amplifier comprises a load device configured to provide a first bias current in the reset period.

According to another aspect of an example embodiment, there is provided a pixel array of an image sensor, the pixel array comprising a plurality of pixels, each of the plurality of pixels comprising a microlens; a first photoelectric conversion device arranged under the microlens and configured to generate first photoelectric charges from a light signal incident thereon; and a first pixel circuit arranged in a pixel area vertically overlapping the microlens and vertically under the first photoelectric conversion device, the first pixel circuit being configured to output a first sensing signal based on an amount of the first photoelectric charges, wherein the first pixel circuit comprises a floating diffusion node that stores the first photoelectric charges; an amplifier comprising a plurality of switching devices, the amplifier being configured to amplify a voltage of the floating diffusion node; and a resistor device configured to provide a bias current to the amplifier in a reset period.

According to yet another aspect of an example embodiment, there is provided an image sensor comprising a pixel array comprising a plurality of pixels arranged in a matrix form, each of the plurality of pixels converting a light signal incident thereon into an electrical signal; and a readout circuit configured to read a plurality of pixel signals on a row basis, the plurality of pixel signals being output from the pixel array through a plurality of column lines, wherein each of the plurality of pixels comprises a photoelectric conversion device configured to convert a light signal into photoelectric charges; a floating diffusion node storing the photoelectric charges; an amplifier comprising a resistor device configured to provide a first bias current in a reset period, the amplifier being configured to inversion-amplify a voltage of the floating diffusion node; and a feedback device configured to provide a first output signal of the amplifier to the floating diffusion node in the reset period.

According to yet another aspect of an example embodiment, there is provided an image sensor comprising a substrate; a pixel array comprising a plurality of pixels, each pixel of the plurality of pixels comprising a pixel circuit formed in a pixel area corresponding to the pixel in the substrate; and a pixel conversion device arranged on the substrate to vertically overlap the pixel circuit, wherein the pixel circuit comprises a floating diffusion node; a reset switching device; and an amplifier comprising a load device and a plurality of switching devices, the load device being arranged in the pixel area.

BRIEF DESCRIPTION OF THE DRAWINGS

Various embodiments will be more clearly understood from the following detailed description taken in conjunction with the accompanying drawings in which.

DETAILED DESCRIPTION

Hereinafter, various embodiments will be described in detail with reference to the accompanying drawings.

Figure 1:
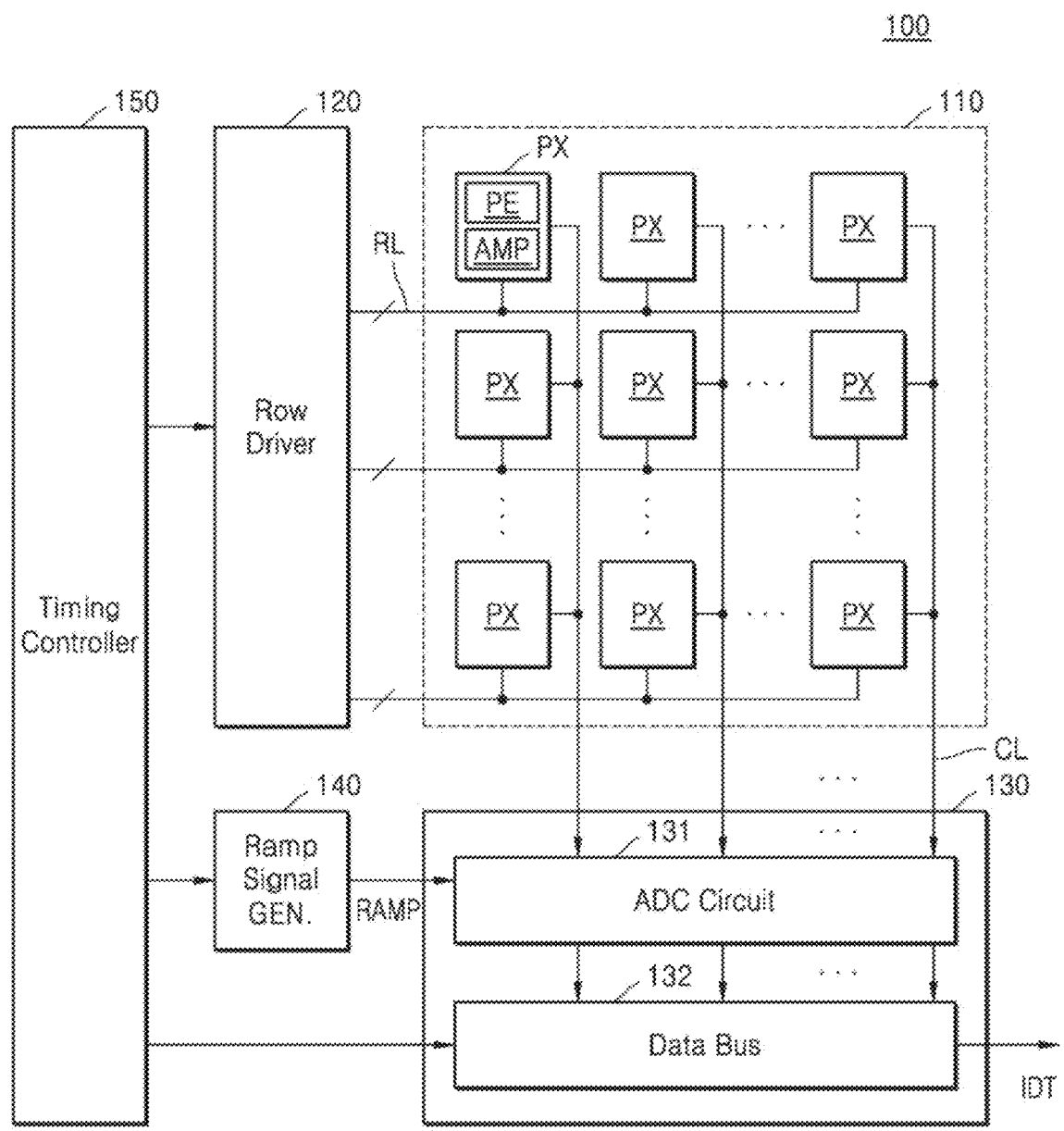
FIG. 1 is a schematic block diagram illustrating pixels and an image sensor including the pixels, according to an example embodiment.

FIG. 1 is a schematic block diagram illustrating pixels and an image sensor including the pixels, according to an example embodiment.

An image sensor 100 may be mounted in an electronic device having a function of sensing an image or light. For example, the image sensor 100 may be mounted in an electronic device, such as a camera, a smart phone, a wearable device, an Internet-of-Things (IoT) device, a household appliance, a tablet personal computer (PC), a personal digital assistant (PDA), a portable multimedia player (PMP), a navigation system, a drone, an advanced drivers assistance system (ADAS), or the like. In addition, the image sensor 100 may be mounted in an electronic device included as a part in vehicles, furniture, manufacturing facilities, doors, and/or various measuring instruments.

Referring to FIG. 1, the image sensor 100 may include a pixel array 110, a row driver 120, a readout circuit 130, a ramp signal generator 140, and a timing controller 150, and the readout circuit 130 may include an analog-digital converter (ADC) circuit 131, and a data bus 132.

The pixel array 110 may include a plurality of pixels PX arranged in a matrix form and includes a plurality of row lines RL and a plurality of column lines CL, which are connected to the plurality of pixels PX.

Figure 2:
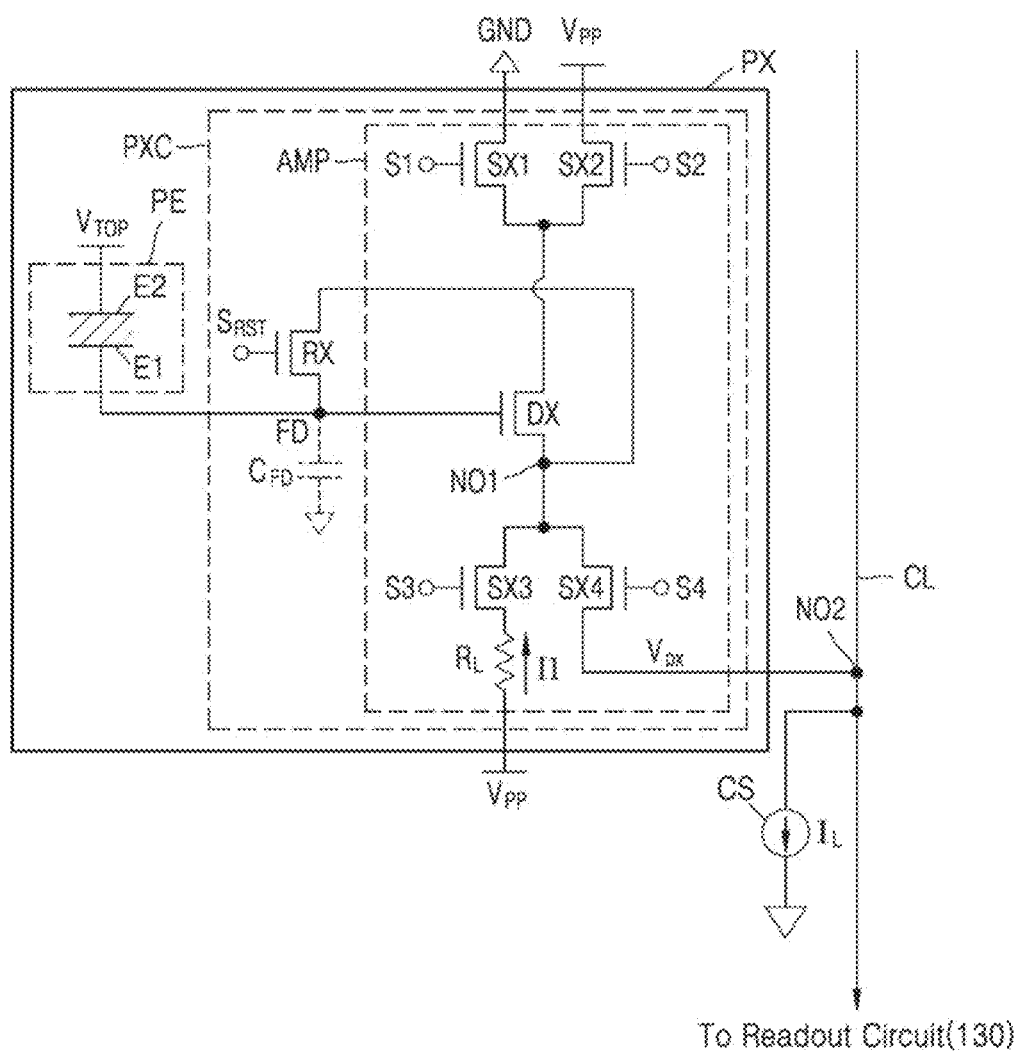
FIG. 2 illustrates an example of a pixel according to an example embodiment.

Each of the plurality of row lines RL may extend in a row direction and may be connected to pixels PX arranged in the same row. For example, each of the plurality of row lines RL may transfer control signals, which are output from the row driver 120, to respective transistors of a pixel circuit (PXC of FIG. 2), as shown in FIG. 2.

Each of the plurality of pixels PX according to an example embodiment may include at least one photoelectric conversion device PE (alternatively referred to as a photosensitive device) and an amplifier AMP. The photoelectric conversion device PE may sense light and may convert the sensed light into photoelectric charges. For example, the photoelectric conversion device PE may include a photosensitive device including an organic or inorganic material, such as an inorganic photodiode, an organic photodiode, a perovskite photodiode, a phototransistor, a photogate, or a pinned photodiode. In some embodiments, each of the plurality of pixels PX may include a plurality of photoelectric conversion devices PE.

The amplifier AMP may inversion-amplify a voltage of a floating diffusion node (FD of FIG. 2) (alternatively referred to as a floating diffusion region), in which the photoelectric charges from the photoelectric conversion device PE are stored, and may output the amplified signal.

In the embodiment of FIG. 1, the amplifier AMP may be operated as a feedback amplifier in a reset period, and the output signal that is output from the amplifier AMP may be fed back to an input of the amplifier AMP, that is, to the floating diffusion node FD. A phase of the input signal of the amplifier AMP may be opposite to that of the output signal of the amplifier AMP.

Noise may be generated at the floating diffusion node FD due to a reset operation in which the floating diffusion node FD is reset in the reset period. However, because the output signal of the amplifier AMP is fed back to the floating diffusion node FD, there may be a noise canceling effect, by which the noise of the floating diffusion node FD is reduced. Therefore, reset noise may be reduced. Hereinafter, as such, the reset operation of a pixel PX, which allows the noise to be reduced based on a feedback operation of the amplifier AMP, will be referred to as feedback reset (or a feedback reset operation). Each of the plurality of pixels PX may perform the feedback reset in the reset period.

A load device (alternatively referred to as a pixel load), for example, a resistor device, which provides a bias current (referred to as a reset bias current) to the amplifier AMP when the feedback reset is performed, may be arranged inside the pixel PX. In other words, each of the plurality of pixels PX may include a load device providing the reset bias current for the pixel PX. A structure of the pixel PX will be described in detail with reference to FIG. 2.

In a signal output period, the amplifier AMP may output a reset signal and a sensing signal to a column line CL. The sensing signal may be generated based on the photoelectric charges stored in the floating diffusion node FD according to light sensing of the photoelectric conversion device PE. A plurality of sensing signals respectively generated by the plurality of pixels PX may have deviations due to noise, for example, reset noise, which is different for each pixel PX. In other words, even when amounts of light respectively sensed by the plurality of pixels PX are equal to each other, the sensing signals respectively output from the plurality of pixels PX may have different levels from each other. In addition, the reset signal may include noise.

To minimize the noise included in the reset signal, that is, the reset noise, as described above, the amplifier AMP included in each of the plurality of pixels PX performs the feedback reset operation and thus suppresses noise generation, whereby the reset noise of each of the plurality of pixels PX may be minimized. In addition, each of the plurality of pixels PX may generate a reset signal representing a level after the reset is performed, for example, a reset level of the floating diffusion node FD, and the image sensor 100 may generate a pixel value representing the amount of light sensed by the pixel PX, based on a difference between the sensing signal and the reset signal both from the pixel PX. For example, the image sensor 100 may generate the pixel value by removing the reset signal from the sensing signal.

A microlens for concentrating light may be arranged over each of the plurality of pixels PX or over each pixel group including adjacent pixels PX. Each of the plurality of pixels PX may sense light in a particular spectral range from light received through the microlens. For example, the pixel array 110 may include a red pixel for converting light in a red spectral range into an electrical signal, a green pixel for converting light in a green spectral range into an electrical signal, and a blue pixel for converting light in a blue spectral range into an electrical signal. A color filter for transmitting light in a particular spectral range may be arranged over each of the plurality of pixels PX. However, example embodiments are not limited thereto, and in some example embodiments, the pixel array 110 may include pixels for converting, into electrical signals, light in other spectral ranges except for the red, green, and blue spectral ranges.

In some embodiments, each of the plurality of pixels PX may have a multilayer structure. The pixel PX having a multilayer structure may include a plurality of stacked photoelectric conversion devices PE converting light in different spectral ranges into electrical signals, and the electrical signals corresponding to different colors may be respectively generated by the plurality of photoelectric conversion devices PE. In other words, the electrical signals corresponding to a plurality of colors may be output from one pixel PX.

Each of the plurality of column lines CL may extend in a column direction and may be connected to pixels PX arranged in the same column. Each of the plurality of column lines CL may transfer reset signals and sensing signals of the pixels PX to the readout circuit 130, on the basis of each row of the pixel array 110.

The timing controller 150 may control timings of the row driver 120, the readout circuit 130, and the ramp signal generator 140. The timing controller 150 may provide timing signals representing operation timings to each of the row driver 120, the readout circuit 130, and the ramp signal generator 140.

Under the control of the timing controller 150, the row driver 120 may generate control signals for driving the pixel array 110 and may provide the control signals to each of the plurality of pixels PX of the pixel array 110 through the plurality of row lines RL. The row driver 120 may control the plurality of pixels PX of the pixel array 110 to sense incident light simultaneously or on a row basis. In addition, the row driver 120 may select pixels PX from the plurality of pixels PX on a row basis and may control the selected pixels PX (for example, pixels PX in one row) to output reset signals and sensing signals through the plurality of column lines CL.

The ramp signal generator 140 may generate a ramp signal RAMP increasing or decreasing with a certain slope and may provide the ramp signal RAMP to the ADC circuit 131 of the readout circuit 130.

The readout circuit 130 may read reset signals and sensing signals from pixels PX in a row selected by the row driver 120 among the plurality of pixels PX. The readout circuit 130 may generate and output pixel values corresponding to the plurality of pixels PX on a row basis by converting reset signals and sensing signals into digital data based on the ramp signal RAMP from the ramp signal generator 140, the reset signals and the sensing signals being received from the pixel array 110 through the plurality of column lines CL.

The ADC circuit 131 may include a plurality of ADCs corresponding to the plurality of column lines CL, and each of the plurality of ADCs may compare the ramp signals RAMP with each of a reset signal and a sensing signal, which are received through a corresponding column line CL, and may generate a pixel value based on results of the comparison. For example, each ADC may remove the reset signal from the sensing signal and may generate the pixel value representing the amount of light sensed by the pixel PX.

A plurality of pixel values generated by the ADC circuit 131 may output as image data IDT through the data bus 132. For example, the image data IDT may be provided to an image signal processor inside or outside the image sensor 100.

As described above, in the image sensor 100, the reset noise may be reduced due to the feedback reset operation of the amplifier AMP arranged inside the pixel PX. In addition, because the load device is arranged inside the pixel PX, a resistive-capacitive (RC) delay may be reduced and settling time may be reduced. Therefore, time required for the feedback reset, that is, the reset period may be reduced.

FIG. 2 illustrates an example of a pixel according to an example embodiment. FIG. 2 illustrates a circuit configuration of the pixel PX.

Referring to FIG. 2, the pixel PX may include a photoelectric conversion device PE and a pixel circuit PXC, and the pixel circuit PXC may include the floating diffusion node FD, the amplifier AMP, and a reset switching device, for example, a reset transistor RX. In some embodiments, the pixel circuit PXC may be formed in a pixel area corresponding to the pixel PX in a substrate, and the photoelectric conversion device PE may be arranged on the substrate to vertically overlap the pixel circuit PXC.

The photoelectric conversion device PE may sense light and may convert the sensed light into photoelectric charges. In some embodiments, the photoelectric conversion device PE may include an organic photodiode including a first electrode E1 and a second electrode E2. The organic photodiode may include an organic photoconductive film (OPF). However, embodiments are not limited thereto, and in some embodiments, the photoelectric conversion device PE may be substituted with another photosensitive device described above, such as an inorganic photodiode, a pinned photodiode, or the like.

One end (for example, the first electrode E1) of the photoelectric conversion device PE may be connected to the floating diffusion node FD, and a first voltage $V_{TOP}$, for example, a global voltage, may be applied to the other end (for example, the second electrode E2) thereof. In some embodiments, the first voltage $V_{TOP}$ may be equally applied to the plurality of pixels PX of the pixel array (110 of FIG. 1).

In some embodiments, when the photoelectric conversion device PE is implemented by an organic photodiode and the image sensor (100 of FIG. 1) is operated in a global shutter manner, the first voltage $V_{TOP}$ may have a low voltage level for an internal reset of the organic photodiode in a readout period and a reset period.

In some embodiments, when the image sensor (100 of FIG. 1) is operated in a rolling shutter manner, a shutter voltage may be applied to the plurality of pixels PX of the pixel array 110 on a row basis. For example, the shutter voltage may be applied to the other end, that is, the second electrode E2, of the photoelectric conversion device PE.

The floating diffusion node FD may store photoelectric charges generated by the photoelectric conversion device PE. Specifically, the photoelectric charges may be stored in a capacitor $C_{FD}$ formed by the floating diffusion node FD.

The amplifier AMP may include a driving transistor DX, a plurality of selection transistors, for example, a first selection transistor SX1, a second selection transistor SX2, a third selection transistor SX3, and a fourth selection transistor SX4, and a load resistor $R_L$, and may be operated based on a first power supply voltage $V_{PP}$ and a second power supply voltage GND (for example, a ground voltage).

The amplifier AMP may amplify an input signal, that is, the voltage of the floating diffusion node FD, and may output the amplified voltage. The amplifier AMP may output the amplified voltage as a first output signal through a first node NO1 in the reset period and may output the amplified voltage as a second output signal through a second node NO2 in the signal output period.

The driving transistor DX may perform phase-inversion amplification on the input signal received through a gate terminal. The first to fourth selection transistors SX1 to SX4 may be turned on or turned off in response to control signals, for example, a first control signal S1, a second control signal S2, a third control signal S3, and a fourth control signal S4, which are received from the row driver (120 of FIG. 1), thereby performing switching operations.

In the reset period, when the first and third selection transistors SX1 and SX3 are turned on in response to the first and third control signals S1 and S3, the amplifier AMP may be operated as a common source amplifier. The amplifier AMP may generate the first output signal by amplifying the input signal based on a reset bias current I1 provided through the load resistor $R_L$.

In the signal output period, when the second and fourth selection transistors SX2 and SX4 are turned on in response to the second and fourth control signals S2 and S4, the amplifier AMP may be operated as a source follower. The amplifier AMP may generate the second output signal by amplifying the input signal based on a load current $I_L$ generated by a current source CS that is connected to a column line CL. The second output signal, which is a pixel voltage Vpx, may be provided to the readout circuit 130 through the column line CL.

The reset transistor RX is connected to the first node NO1 of the amplifier AMP and the floating diffusion node FD and may be turned on in response to an active level (for example, logic high) of a reset control signal $S_{RST}$ received from the row driver (120 of FIG. 1) in the reset period. Accordingly, the first output signal output from the amplifier AMP in the reset period may be fed back to the floating diffusion node FD. Because a phase of the first output signal, for example, an amplified voltage, is opposite to that of the voltage of the floating diffusion node FD, noise may be reduced due to the feedback reset. In the signal output period, the amplifier AMP may be turned off in response to an inactive level (for example, logic low) of the reset control signal $S_{RST}$.

Although FIG. 2 illustrates that the pixel PX includes one photoelectric conversion device PE and one pixel circuit PXC, embodiments are not limited thereto, and in some embodiments, the pixel PX may include a plurality of photoelectric conversion devices PE and a plurality of pixel circuits PXC respectively connected to the plurality of photoelectric conversion devices PE. In such a case, the plurality of photoelectric conversion devices PE may convert light signals having different colors from each other into photoelectric charges.

As shown in FIG. 2, in the pixel PX, one end of the photoelectric conversion device PE may be directly connected to the floating diffusion node FD. In other words, a separate switching device may be omitted and thus may not be arranged between the one end of the photoelectric conversion device PE and the floating diffusion node FD. Accordingly, the photoelectric charges generated by the photoelectric conversion device PE may be directly stored in the floating diffusion node FD.

In the pixel PX having such a structure, the reset signal according to the reset operation may be read out, followed by performing exposure, and then, the sensing signal may be read out, or exposure may be performed, followed by performing readout of the sensing signal, and then, the reset signal according to the reset operation may be read out. Therefore, it is difficult to apply a readout method that is based on correlated double sampling (CDS), in which readout of the reset signal and readout of the sensing signal including the reset signal are performed and the reset signal is subtracted from the sensing signal, and there may be image quality deterioration in image data due to the reset noise. However, as described above, in the pixel PX according to various example embodiments, because canceling, that is, reduction, of the reset noise may be achieved through the feedback reset, the image quality deterioration may be prevented.

Figure 3A:
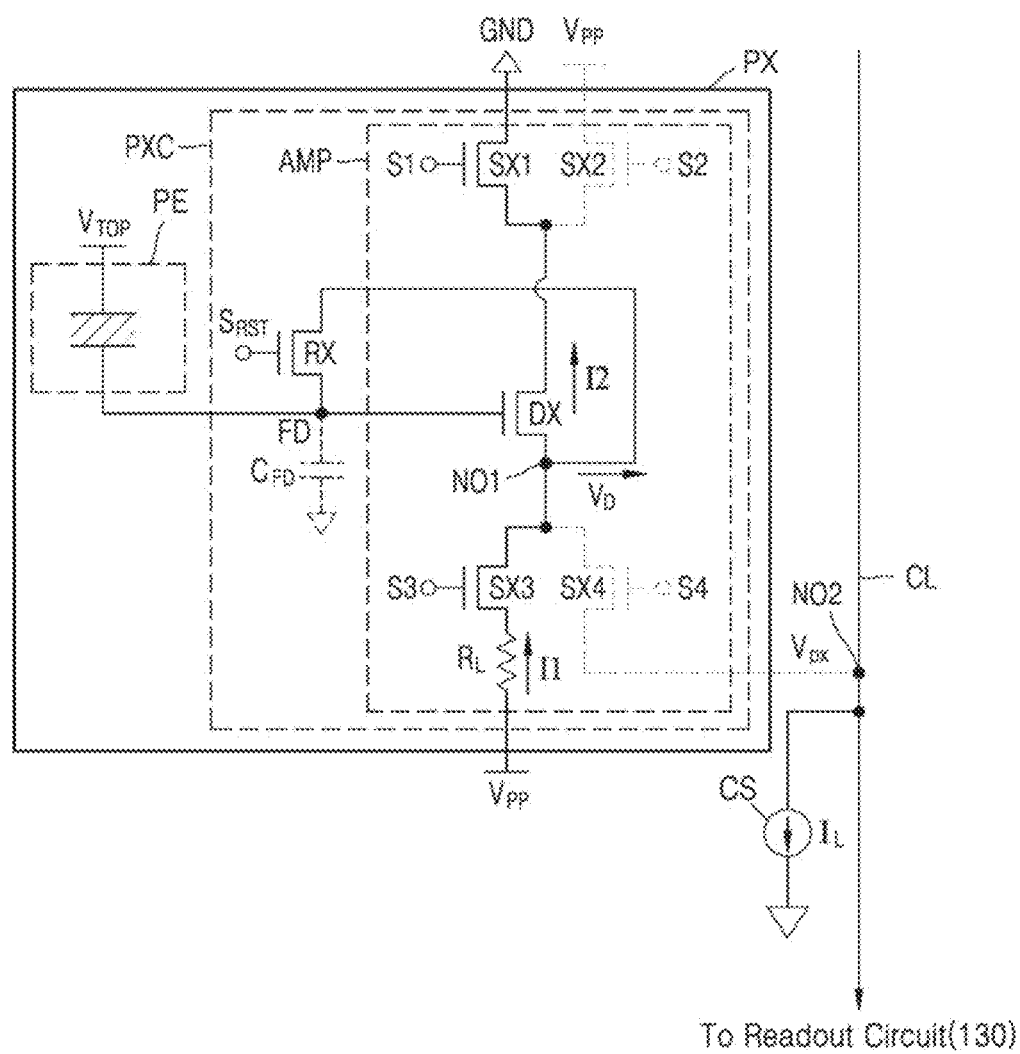
FIGS. 3A and 3B respectively illustrate operations of the pixel of FIG. 2 in a reset period and a signal output period.
Figure 3B:
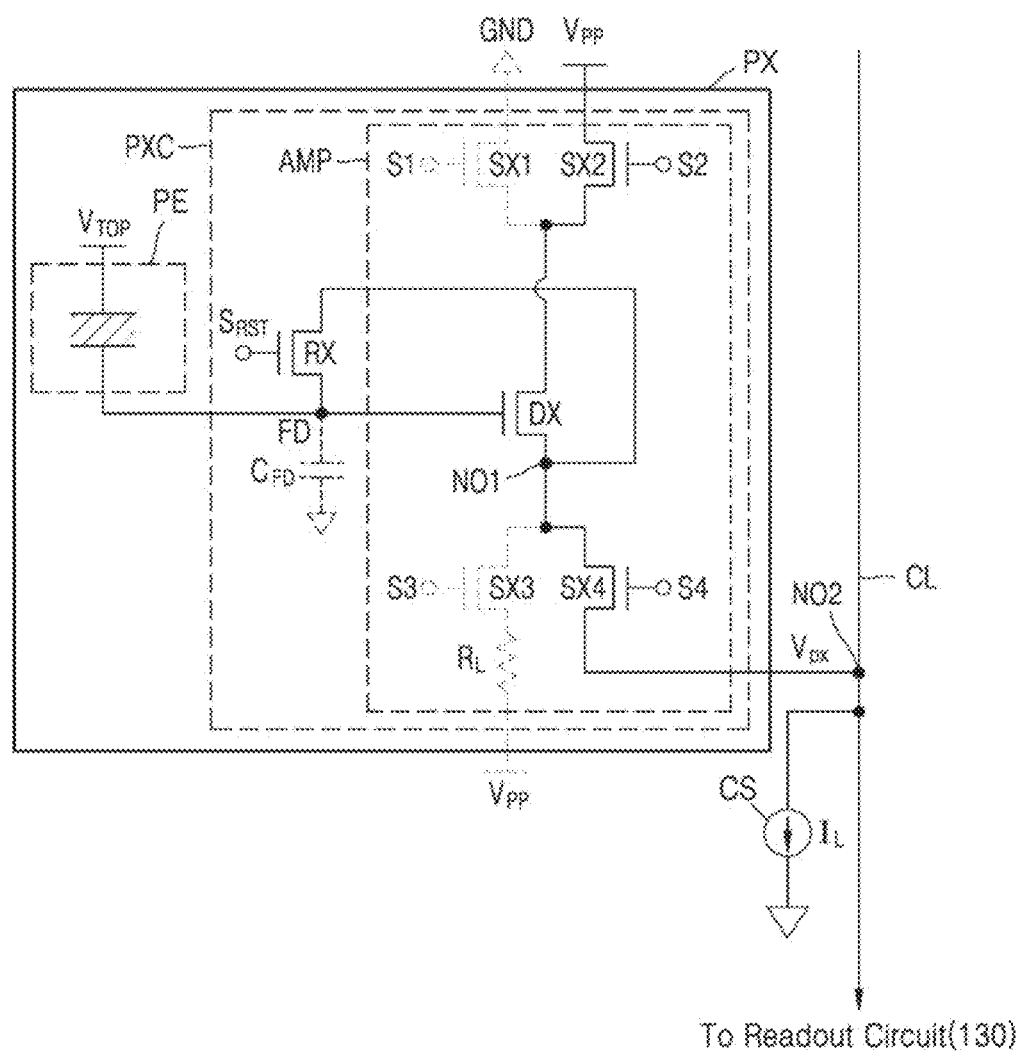

FIGS. 3A and 3B respectively illustrate operations of the pixel of FIG. 2 in the reset period and the signal output period.

Referring to FIG. 3A, in the reset period, the first and third selection transistors SX1 and SX3 may be respectively turned on in response to active levels (for example, logic high) of the first and third control signals S1 and S3, and the second and fourth selection transistors SX2 and SX4 may be respectively turned off in response to inactive levels (for example, logic low) of the second and fourth control signals S2 and S4. In addition, the reset transistor RX may be turned on in response to an active level of the reset control signal $S_{RST}$. A drain voltage $V_D$ of the driving transistor DX, for example, the first output signal, which is output through the second node NO2, may be fed back to the gate terminal of the driving transistor DX. Accordingly, the pixel PX may be feedback-reset. The feedback reset of the pixel PX will be described with additional reference to FIGS. 4A and 4B.

Figure 4A:
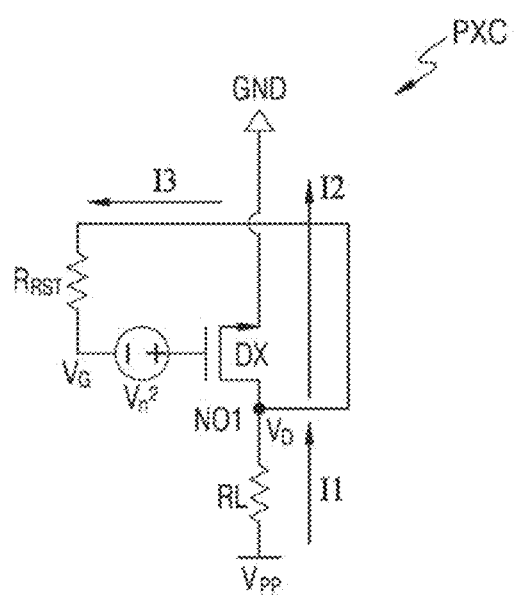
FIG. 4A illustrates an equivalent circuit of a pixel circuit in a reset period, according to an example embodiment.
Figure 4B:
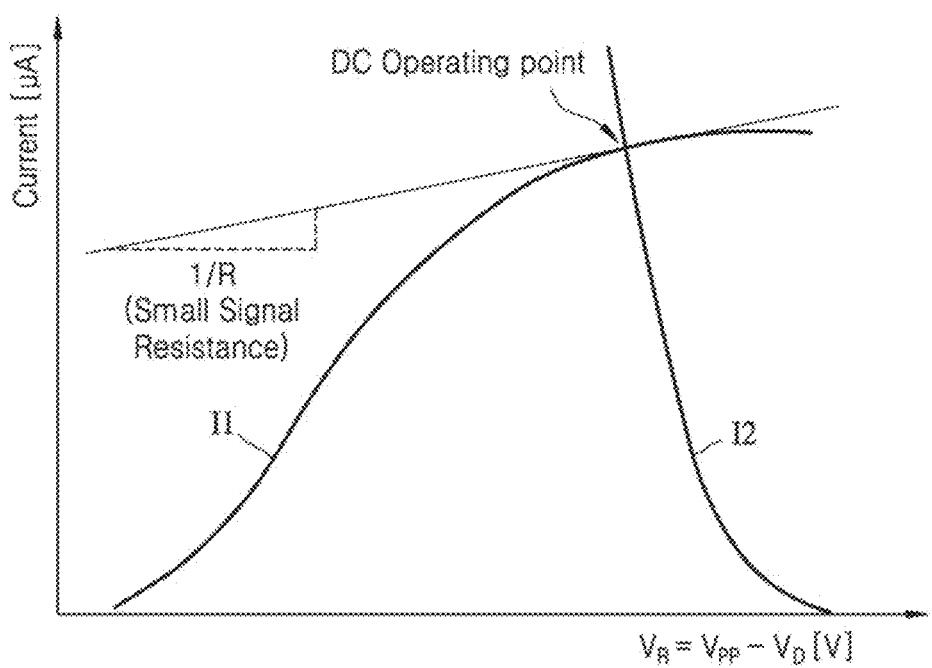
FIG. 4B is a graph illustrating a DC operating point of a pixel circuit in a reset period.

FIG. 4A illustrates an equivalent circuit of a pixel circuit in the reset period, according to an example embodiment, and FIG. 4B is a graph illustrating a direct current (DC) operating point of the pixel circuit in the reset period.

The driving transistor DX of the amplifier AMP may receive the voltage of the floating diffusion node FD as an input voltage through the gate terminal and may inversion-amplify the input voltage. Here, the input voltage may include a noise component, for example, $Vn^2$ (where Vn is a noise voltage according to an amount of noise charge of the floating diffusion node FD). The inversion-amplified voltage, for example, the drain voltage $V_D$, may be output through the first node NO1 and the drain voltage $V_D$ may be fed back to the gate terminal of the driving transistor DX, and here, turn-on resistance $R_{RST}$ of the reset transistor RX may be extremely small. The reset bias current I1 provided through the load resistor $R_L$ may be equal to a sum of a current I2 flowing through the driving transistor DX and a current I3 flowing through a feedback loop. The drain voltage $V_D$ and the current I2 may be respectively represented by Equation 1 and Equation 2.

$$V_D = V_{PP} - R_L \times I1 \qquad [\text{Equation 1}]$$

$$I2 = \frac{1}{2} \times \beta \times (V_D - Vth)^2 \qquad [\text{Equation 2}]$$

Here, β denotes a parameter determined based on the mobility and size of the driving transistor DX, and Vth denotes a threshold voltage of the driving transistor DX.

Ideally, the feedback current I3 shown in FIG. 4A may be "0", and the drain voltage $V_D$ and a gate voltage $V_G$ of the driving transistor DX may be substantially equal to each other. Accordingly, by the feedback operation of the amplifier AMP, the gate voltage $V_G$ and the drain voltage $V_D$ may be adjusted such that the reset bias current I1 is equal to the current I2, and thus, the noise component may be canceled. In other words, by the feedback reset, a reset voltage (reset level) of the floating diffusion node FD, from which the noise component is canceled, may be determined.

Referring to FIG. 4B, the horizontal axis represents a voltage $V_R$ corresponding to a potential difference between both ends of the load resistor $R_L$, and the vertical axis represents a current. As the voltage $V_R$ increases, the reset bias current I1 may increase and the current I2 may decrease. The voltage $V_R$ may be determined such that the reset bias current I1 is equal to the current I2. Here, the first power supply voltage $V_{PP}$ and the drain voltage $V_D$ are respectively applied to both ends of the load resistor $R_L$, and because the first power supply voltage $V_{PP}$ is constant and the drain voltage $V_D$ is variable, a voltage between both ends of the load resistor $R_L$ may be determined by the drain voltage $V_D$.

A point at which the reset bias current I1 is equal to the current I2 is a DC operating point, and a resistance value (small signal resistance) of the load resistor $R_L$ may be determined such that the voltage $V_R$ corresponding to the DC operating point is provided. For example, the reciprocal of a slope of a tangent of the reset bias current I1 at the DC operating point may be the small signal resistance of the load resistor $R_L$ under the condition that a small signal operation of the pixel circuit PXC is able to be normally performed. For example, when the voltage $V_R$ is 3 V or less and the reset bias current I1 is several microamperes (μA) or less, the resistance may be several megaohms. The load resistor $R_L$ may have a resistance in megaohms such that the pixel circuit PXC is able to normally perform the feedback reset operation in the reset period.

Referring to FIG. 3B, in the signal output period, the first and third selection transistors SX1 and SX3 may be turned off in response to inactive levels (for example, logic low) of the first and third control signals S1 and S3, and the second and fourth selection transistors SX2 and SX4 may be turned on in response to active levels (for example, logic high) of the second and fourth signals S2 and S4. The amplifier AMP may be operated as a source follower, and a voltage amplified by the amplifier AMP, that is, the drain voltage $V_D$ (for example, the second output signal), may be output as the pixel voltage Vpx to the column line CL.

The signal output period may include a first period and a second period. The first period may be a reset signal output period, and the second period may be a sensing signal output period. The reset signal output period is a period after the reset period of the pixel PX, and the amplifier AMP may output the reset voltage, which represents the reset level reduced in noise by the feedback reset, as the pixel voltage Vpx, for example, the second output signal, through the second node NO2. The sensing signal output period is a period after an exposure period of the pixel PX, that is, a period after the photoelectric charges generated by the photoelectric conversion device PE are stored in the floating diffusion node FD, and the amplifier AMP may generate a sensing voltage based on the photoelectric charges stored in the floating diffusion node FD and may output the sensing voltage as the pixel voltage Vpx, for example, the second output signal, through the second node NO2. The pixel voltage Vpx, that is, the reset voltage and the sensing voltage may be transmitted to the readout circuit (130 of FIG. 1) through the column line CL.

Figure 5A:
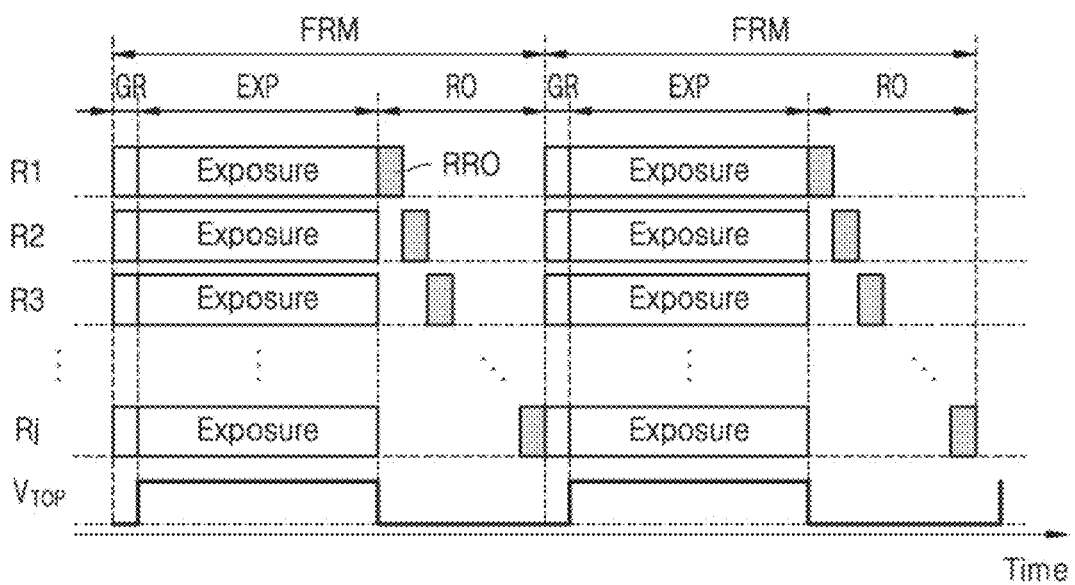
FIGS. 5A and 5B each illustrate a timing diagram of a pixel array, according to an example embodiment.
Figure 5B:
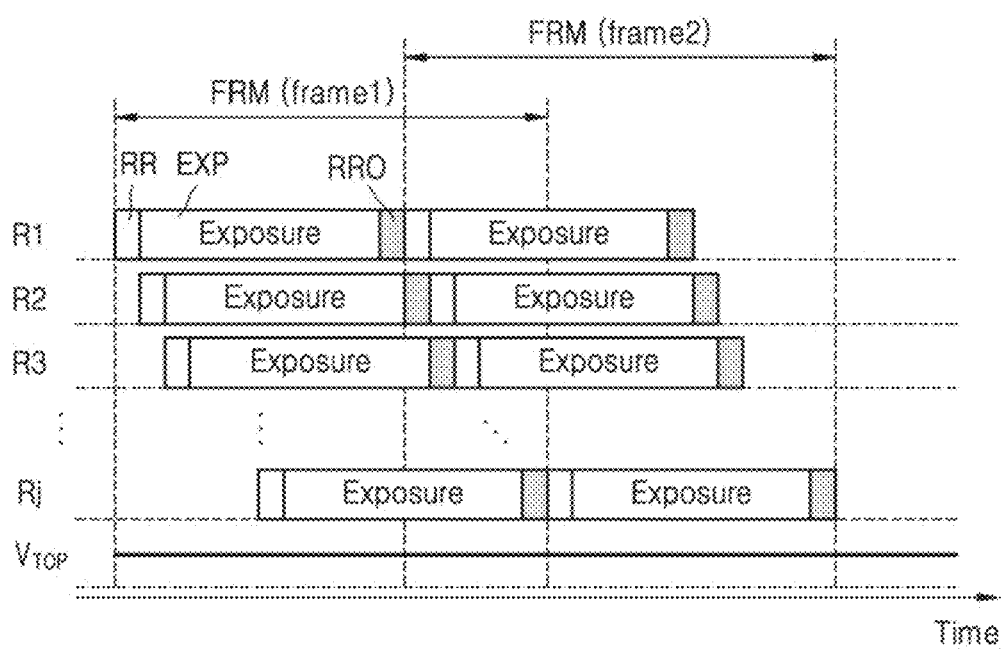

FIGS. 5A and 5B each illustrate a timing diagram of a pixel array, according to an example embodiment.

FIG. 5A illustrates a timing diagram of the pixel array (110 of FIG. 1) when an image sensor is operated in a global shutter manner, according to an example embodiment, and FIG. 5B illustrates a timing diagram of the pixel array 110 when the image sensor is operated in a rolling shutter manner, according to an example embodiment.

Referring to FIGS. 1 and 5A, a frame period FRM may include a global reset period GR (alternatively referred to as a shutter period), an exposure period EXP, and a readout period RO. In the global reset period GR, the feedback reset may be performed by the plurality of pixels PX of the pixel array 110. In the exposure period EXP, the photoelectric conversion device PE may convert a light signal into photoelectric charges, and the photoelectric charges may be stored in the floating diffusion node (FD of FIG. 2). In the readout period RO, a plurality of rows R1 to Rj (where j is a positive integer of 3 or more) of the pixel array 110 may be read out to the readout circuit 130 sequentially on a row basis, and the ADC circuit 131 may convert a received signal, for example, a sensing signal and a reset signal, into digital data, for example, pixel values. A readout period of each of the plurality of rows R1 to Rj may be referred to as a row readout period RRO.

When the photoelectric conversion device PE is implemented by an organic photodiode, the first voltage $V_{TOP}$, for example, the global voltage, applied to the photoelectric conversion device PE may have a low voltage level, for example, 0 V, in the readout period RO and the global reset period GR, and thus, the organic photodiode may be internally reset.

In the global reset period GR, the feedback reset may be performed by the plurality of pixels PX of the pixel array 110, and in the row readout period RRO, the feedback reset may be performed by the pixel PX arranged in a corresponding row. This will be described with reference to FIGS. 6A and 6B.

Referring to FIGS. 1 and 5B, the frame period FRM for each row of the pixel array 110 may include a row reset period RR, the exposure period EXP, and the row readout period RRO. A row reset, an exposure, and a row readout may be sequentially performed in this stated order on a row basis. Frame periods FRM may overlap each other. For example, as shown in FIG. 5B, a frame 1 may overlap a frame 2 in terms of time. However, embodiments are not limited thereto, and in some embodiments, the frame 2 may start after the frame 1 ends.

The first voltage $V_{TOP}$, for example, the shutter voltage, may have a high voltage level, for example, 3 V, and the shutter voltage may be applied to each row of the pixel array 110, whereby the exposure may be sequentially performed in the plurality of rows R1 to Rj.

In the row reset period RR, the feedback reset may be performed by the pixel PX arranged in the corresponding row, and in the row readout period RRO, the feedback reset may be performed by the pixel PX arranged in the corresponding row. This will be described with reference to FIGS. 6A and 6B.

Figure 6A:
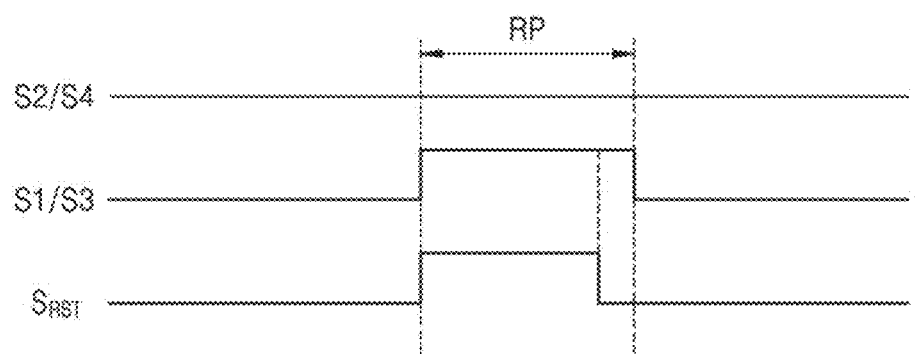
FIGS. 6A and 6B are each a timing diagram illustrating control signals and a reset control signal, which are applied to a pixel circuit, according to an example embodiment.
Figure 6B:
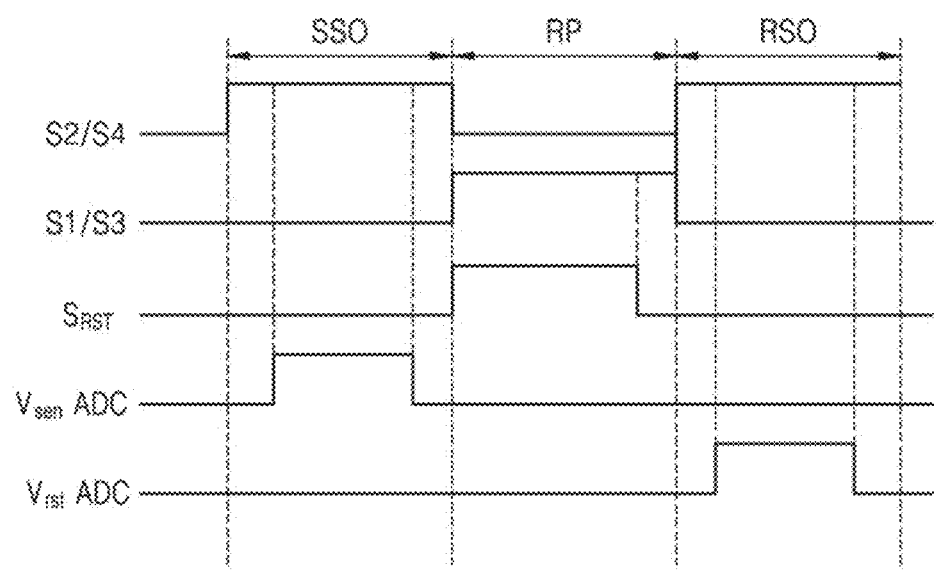

FIGS. 6A and 6B are each a timing diagram illustrating control signals and a reset control signal, which are applied to a pixel circuit, according to an example embodiment. FIG. 6A is a timing diagram of the global reset period GR in FIG. 5A or the row reset period RR in FIG. 5B, according to an example embodiment, and FIG. 6B is a timing diagram of the row readout period RRO in FIGS. 5A and 5B, according to an example embodiment.

Referring to FIGS. 2 and 6A, a portion of the global reset period GR or the row reset period RR may be the reset period RP, and the feedback reset may be performed in the reset period RP. The second control signal S2 and the fourth control signal S4 may be at an inactive level, for example, logic low, and the reset control signal $S_{RST}$, the first control signal S1, and the third control signal S3 may be at an active level, for example, logic high. Accordingly, the amplifier AMP may be operated as a common source amplifier based on the reset bias current I1 provided through the load resistor $R_L$, and the pixel PX may perform the feedback reset.

Referring to FIGS. 2 and 6B, a portion of the row readout period RRO may be the reset period RP, and another portion thereof may be the signal output period, for example, a sensing signal output period SSO and a reset signal output period RSO.

The second control signal S2 and the fourth control signal S4 may be at an active level in the sensing signal output period SSO and the reset signal output period RSO, and the reset control signal $S_{RST}$, the first control signal S1, and the third control signal S3 may be at an inactive level. Accordingly, the amplifier AMP may be operated as a source follower. The amplifier AMP may generate the second output signal, for example, the pixel voltage Vpx, and may output the second output signal to the column line CL. The pixel voltage Vpx may be provided to the readout circuit 130 through the column line CL, and the ADC circuit 131 may generate a pixel value based on the received pixel voltage Vpx.

In the sensing signal output period SSO after the exposure period, a sensing signal may be output as the pixel voltage Vpx, and the ADC circuit 131 may perform an analog-to-digital conversion on a sensing signal Vsen.

Next, the feedback reset may be performed in the reset period RP. The second control signal S2 and the fourth control signal S4 may transit to an inactive level, and the reset control signal $S_{RST}$, the first control signal S1, and the third control signal S3 may transit to an active level. The amplifier AMP may be operated as a common source amplifier, and the pixel PX may perform the feedback reset.

In the reset signal output period RSO after the reset period RP, the second control signal S2 and the fourth control signal S4 may transit again to an active level, and the reset control signal $S_{RST}$, the first control signal S1, and the third control signal S3 may transit to an inactive level.

The amplifier AMP may output the reset signal as the second output signal, for example, the pixel voltage Vpx. The ADC circuit 131 may perform the ADC conversion on the reset signal Vrst.

Figure 7A:
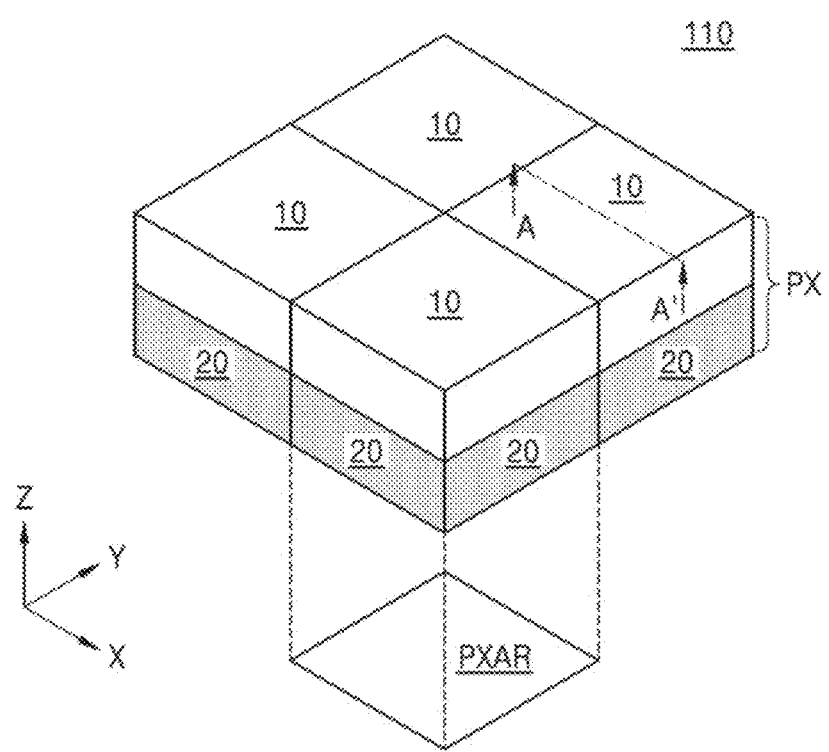
FIG. 7A is a schematic perspective view of a pixel array according to an example embodiment.
Figure 7B:
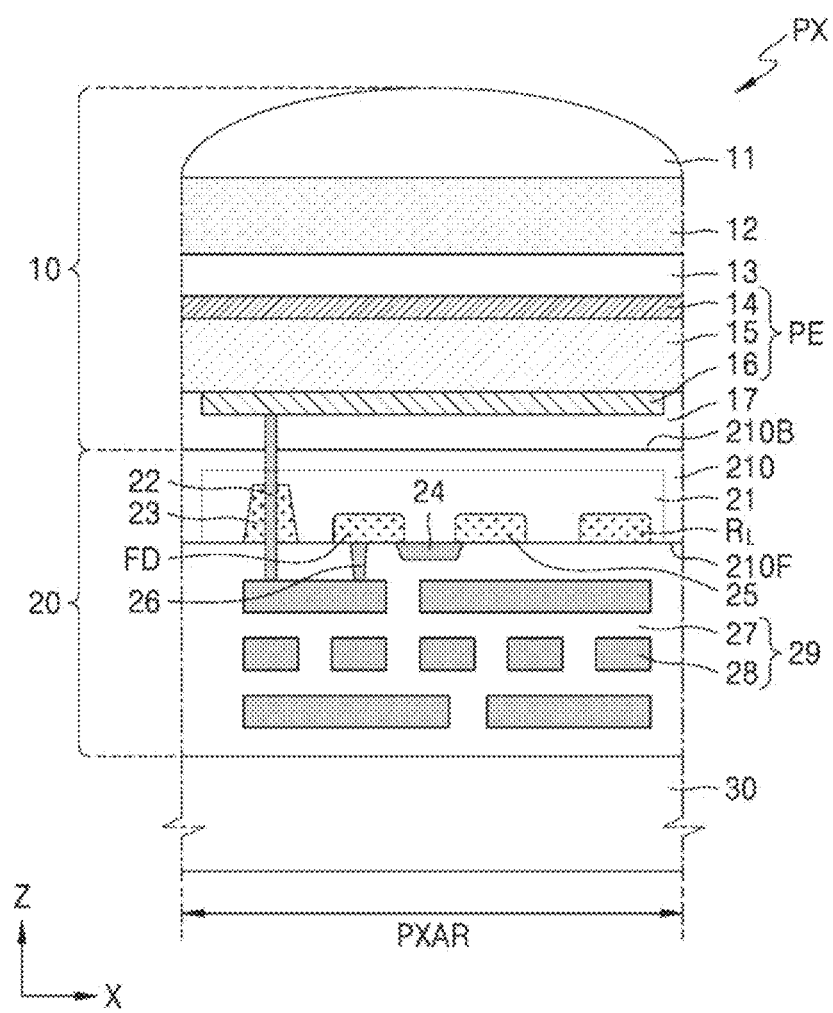
FIG. 7B is a schematic vertical sectional view along A-A' of a pixel included in the pixel array shown in FIG. 7A.

FIG. 7A is a schematic perspective view of a pixel array according to an example embodiment, and FIG. 7B is a schematic vertical sectional view of a pixel included in the pixel array shown in FIG. 7A. The vertical sectional view of the pixel PX of FIG. 7B may correspond to an example configuration of a region corresponding to a cross-section of the pixel PX of FIG. 7A, taken along a line A-A' of FIG. 7A.

Referring to FIGS. 7A and 7B, the pixel array 110 may include the plurality of pixels PX arranged in a matrix form on an X-Y plane. An area in which each of the plurality of pixels PX is formed on the X-Y plane may be referred to as a pixel area PXAR. Each of the plurality of pixels PX may include a substrate 210. In other words, the pixel array 110 may include the substrate 210. The substrate 210 may have a first surface (for example, a main surface) 210F and a second surface (for example, a back surface) 210B, which extend in horizontal directions (an X direction and a Y direction). The substrate 210 may include, but is not limited to, a semiconductor substrate, for example, a p-type silicon substrate.

Each of the plurality of pixels PX may include a photoelectric conversion unit 10 and a pixel circuit unit 20. The photoelectric conversion unit 10 may overlap the pixel circuit unit 20 vertically (for example, in a Z direction).

The photoelectric conversion unit 10 may be formed on an insulating structure 17 on the second surface 210B of the substrate 210 and may include a microlens 11, a color filter 12, and the photoelectric conversion device PE. In some embodiments, the photoelectric conversion unit 10 may further include the color filter 12, a protective layer 13, and the insulating structure 17.

The microlens 11 may be arranged over the photoelectric conversion device PE and may concentrate light incident from outside thereof to cause the light to be incident upon the photoelectric conversion device PE.

The photoelectric conversion device PE may include an upper electrode 14, a lower electrode 16, and a color selection layer 15 therebetween. The color selection layer 15 may absorb a light signal in a particular wavelength band from a received light signal. The absorbed light signal may be converted, in the color selection layer 15, into an electrical signal by a current flowing through the upper electrode 14 and the lower electrode 16.

The color selection layer 15 may include an organic conductive film making a photoelectric change due to a light signal in a particular wavelength band. In some embodiments, the color selection layer 15 may include an organic film in which a p-type semiconductor material and an n-type semiconductor material form a pn flat junction or a bulk heterojunction. The organic film may include a single film or a multilayer film.

Each of the upper electrode 14 and the lower electrode 16 may include a transparent conductive layer. In some embodiments, each of the upper electrode 14 and the lower electrode 16 may include indium tin oxide (ITO), indium zinc oxide (IZO), ZnO, $SnO_2$, antimony-doped tin oxide (ATO), aluminum-doped zinc oxide (AZO), gallium-doped zinc oxide (GZO), $TiO_2$, or fluorine-doped tin oxide (FTO).

The color filter 12 may selectively transmit a light signal in a particular wavelength band and may be arranged between the microlens 11 and the photoelectric conversion device PE. For example, the color filter 12 may selectively transmit a light signal in a first wavelength band, and the photoelectric conversion device PE may convert the light signal in the first wavelength band into photoelectric charges, the light signal passing through the color filter 12 and being received by the photoelectric conversion device PE.

The protective layer 13 may be arranged between the color filter 12 and the upper electrode 14 of the photoelectric conversion device PE. In some embodiments, the protective layer 13 may be arranged between the microlens 11 and the color filter 12. The protective layer 13 may include a transparent insulating material. In some embodiments, the protective layer 13 may include a plurality of insulating films having different refractive indices from each other.

The pixel circuit unit 20 may be formed beneath the photoelectric conversion unit 10 and may include the floating diffusion node FD, a source/drain 25, and the load resistor $R_L$, which are formed on the first surface 210F of the substrate 210. The pixel circuit unit 20 may further include a gate 24, a via contact 26, and a wiring structure 29, which are formed beneath the first surface 210F of the substrate 210. The aforementioned components, that is, the floating diffusion node FD, the source/drain 25, the load resistor $R_L$, the gate 24, the via contact 26, and the wiring structure 29, of the pixel circuit unit 20 may constitute a pixel circuit (for example, PXC of FIGS. 3A and 3B).

A well region may be formed in the substrate 210. For example, in some embodiments, the well region may be a p-type well region 21, and the p-type well region 21 may be formed in the substrate 210, and the floating diffusion node FD, the source/drain 25, and the load resistor $R_L$ may be formed in the p-type well region 21. In addition, a device isolation film 23 may be formed inside/outside the p-type well region 21. A through-electrode 22 may be formed to extend through the substrate 210 in a thickness direction of the substrate 210, that is, the Z direction. The through-electrode 22 may be connected to the lower electrode 16 of the photoelectric conversion device PE. In some embodiments, the through-electrode 22 may be formed through the device isolation film 23.

In some embodiments, p-type impurities may be implanted into the semiconductor substrate 210, thereby forming the p-type well region 21. In addition, n-type impurities may be implanted into the p-type well region 21, thereby forming the floating diffusion node FD, the source/drain 25, and the load resistor $R_L$. The p-type well region 21, the floating diffusion node FD, the source/drain 25, and the load resistor $R_L$ may be formed by a diffusion process or an ion implantation process.

The load resistor $R_L$ is a resistor formed in the p-type well region 21 and may be referred to as a well resistor. For example, the load resistor $R_L$ may be formed by ion implantation of n-type impurities in the p-type well region 21, and the load resistor $R_L$ in megaohms for small signal operations may be formed by adjusting energy and dose upon the ion implantation. The load resistor $R_L$ may be formed adjacent to a lateral side of the pixel area PXAR, as will be described below with reference to FIGS. 8A and 8B.

The wiring structure 29 may include a plurality of wiring lines 28 and an interlayer dielectric 27 insulating the plurality of wiring lines 28 from each other. Each of the plurality of wiring lines 28 may include a metal, for example, copper (Cu), aluminum (Al), or tungsten (W). The interlayer dielectric 27 may include an oxide film, a nitride film, or a combination thereof.

In some embodiments, a supporting film 30 may be bonded to the wiring structure 29. The supporting film 30 may be used for reinforcement of the strength of the substrate 210. The supporting film 30 may include a silicon oxide film, a silicon nitride film, or a semiconductor film.

Although an example, in which the pixel PX includes one photoelectric conversion device PE, has been described with reference to FIG. 7B, the pixel PX may include two or more photoelectric conversion devices PE in some embodiments. For example, the photoelectric conversion unit 10 may include a photoelectric conversion device PE absorbing a light signal in a first wavelength band and may further include another photoelectric conversion device PE absorbing a light signal in a second wavelength band different from the first wavelength band, and the color filter 12 may be arranged between the photoelectric conversion device PE and the other photoelectric conversion device PE to transmit the light signal in the second wavelength band.

Figure 8A:
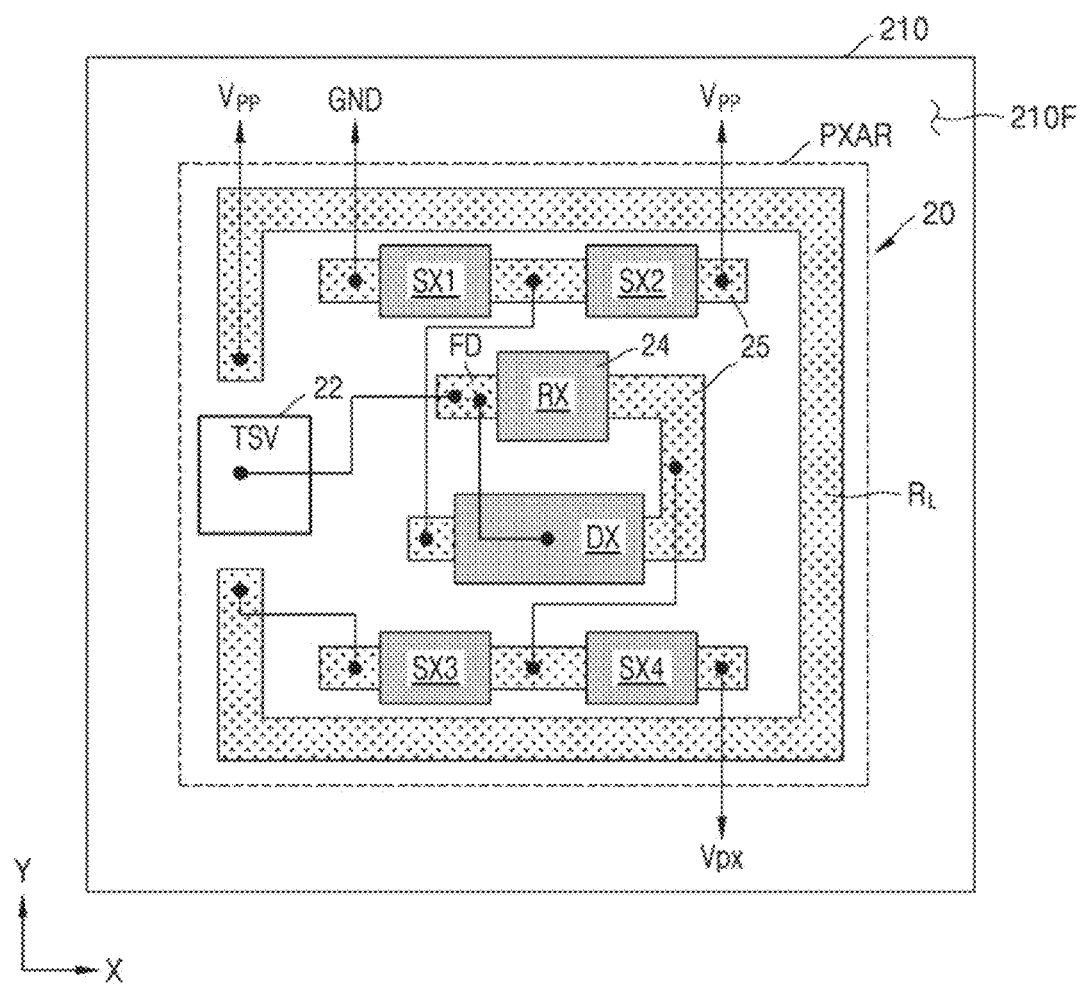
FIGS. 8A and 8B are each a schematic plan view of a pixel according to an example embodiment.
Figure 8B:
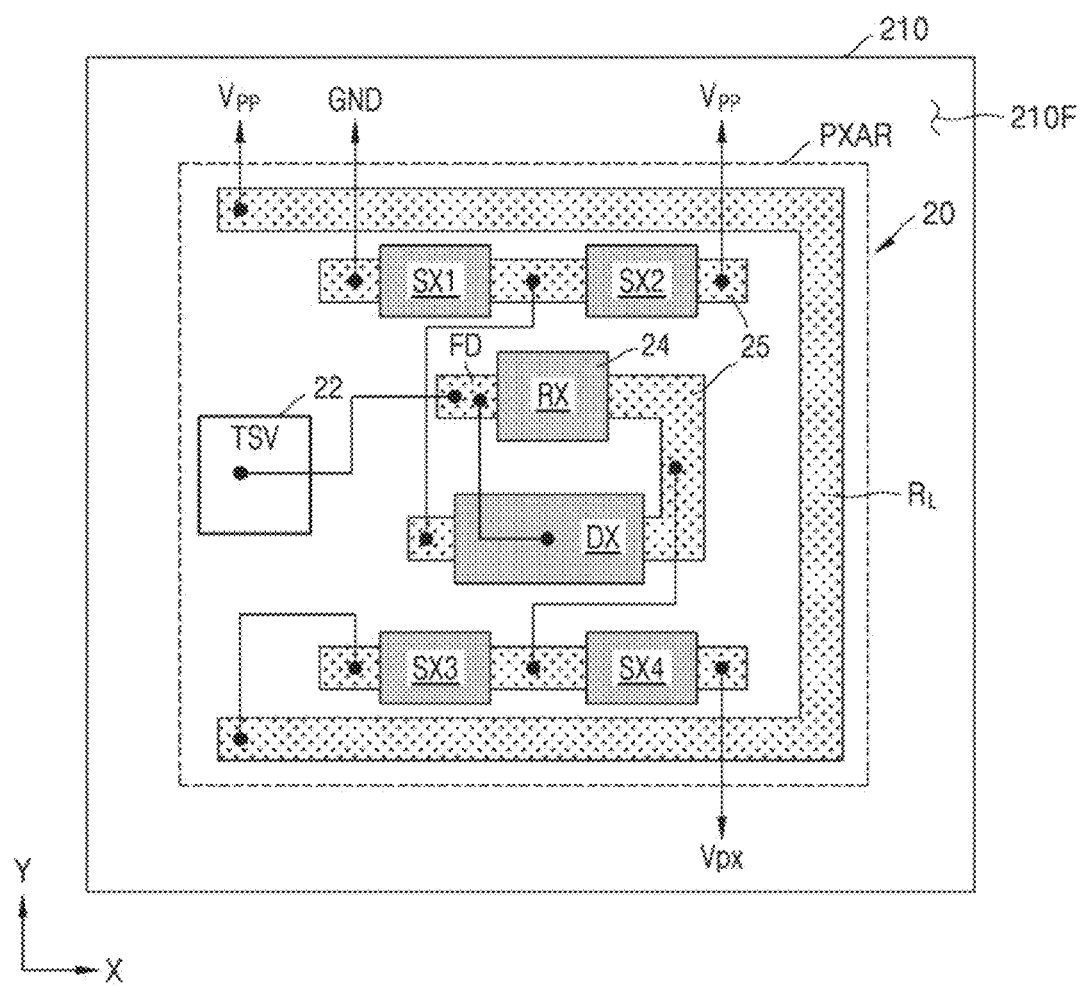

FIGS. 8A and 8B are each a schematic plan view of a pixel according to an example embodiment. Specifically, FIGS. 8A and 8B are each a plan view of the pixel circuit unit 20 in a direction of the first surface 210F of the substrate 210 and schematically illustrate a physical layout of the pixel circuit PXC of FIG. 2. Although each of FIGS. 8A and 8B illustrates the pixel circuit unit 20 of one pixel PX, a plurality of pixel circuit units 20 corresponding to the plurality of pixels PX may be arranged in a matrix form, as shown in FIG. 7A.

In the pixel area PXAR of the substrate 210, the floating diffusion node FD, the source/drain 25, the gate 24, and the load resistor $R_L$ may be arranged, and the through-electrode (TSV) 22 may also be arranged. For matching with the pixel circuit PXC of FIG. 2, an electrical connection relation between the aforementioned components is illustrated. For example, the components may be electrically connected to each other through the via contact (26 of FIG. 7B) and a plurality of wiring lines (28 of FIG. 7B).

The source/drain 25 and the gate 24 may constitute a transistor, for example, the reset transistor RX, the driving transistor DX, and the first to fourth selection transistors SX1 to SX4. The reset transistor RX, the driving transistor DX, and the first to fourth selection transistors SX1 to SX4 may be arranged in a relatively inner region in the pixel area PXAR.

The load resistor $R_L$ may be arranged in a relatively outer region in the pixel area PXAR. In some embodiments, the load resistor $R_L$ may be arranged adjacent to a lateral side of the pixel area PXAR. Referring to FIG. 8A, in some embodiments, the load resistor $R_L$ may be arranged to surround the pixel area PXAR. In other words, the load resistor $R_L$ may be arranged to surround the reset transistor RX, the driving transistor DX, and the first to fourth selection transistors SX1 to SX4. However, embodiments are not limited thereto, and in some embodiments, the load resistor $R_L$ may be arranged adjacent to and along at least one of four lateral sides of the pixel area PXAR. For example, as shown in FIG. 8B, in some embodiments, the load resistor $R_L$ may be arranged adjacent to and along three of four lateral sides of the pixel area PXAR. In some embodiments, the load resistor $R_L$ may be formed in an empty space in the pixel area PXAR, in other words, in a remaining space in which the floating diffusion node FD, the source/drain 25, and the gate 24 are not formed, and may be formed with a great length such that the load resistor $R_L$ may have high resistance.

Figure 9:
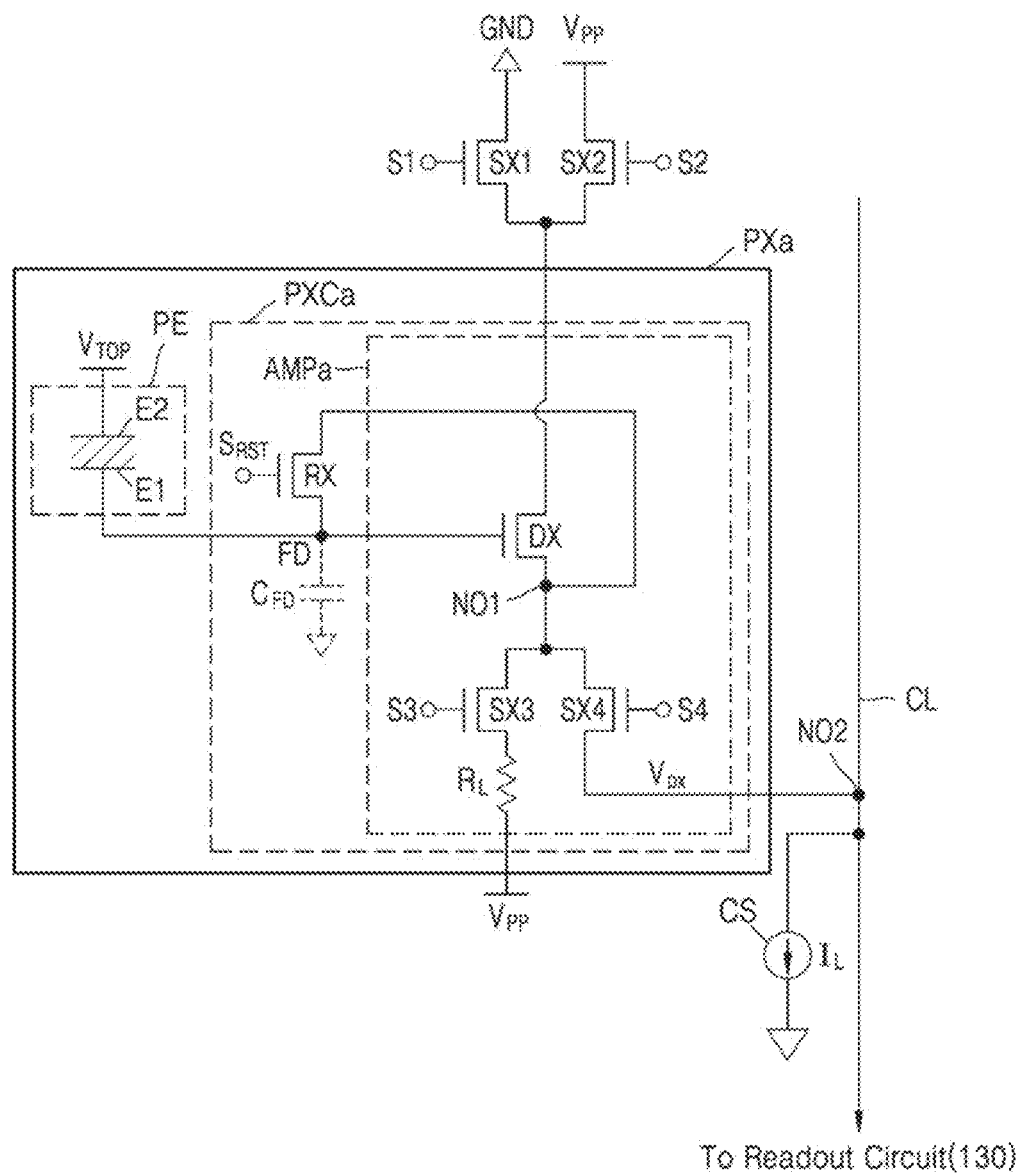
FIG. 9 illustrates an example of another pixel according to an example embodiment.
Figure 10:
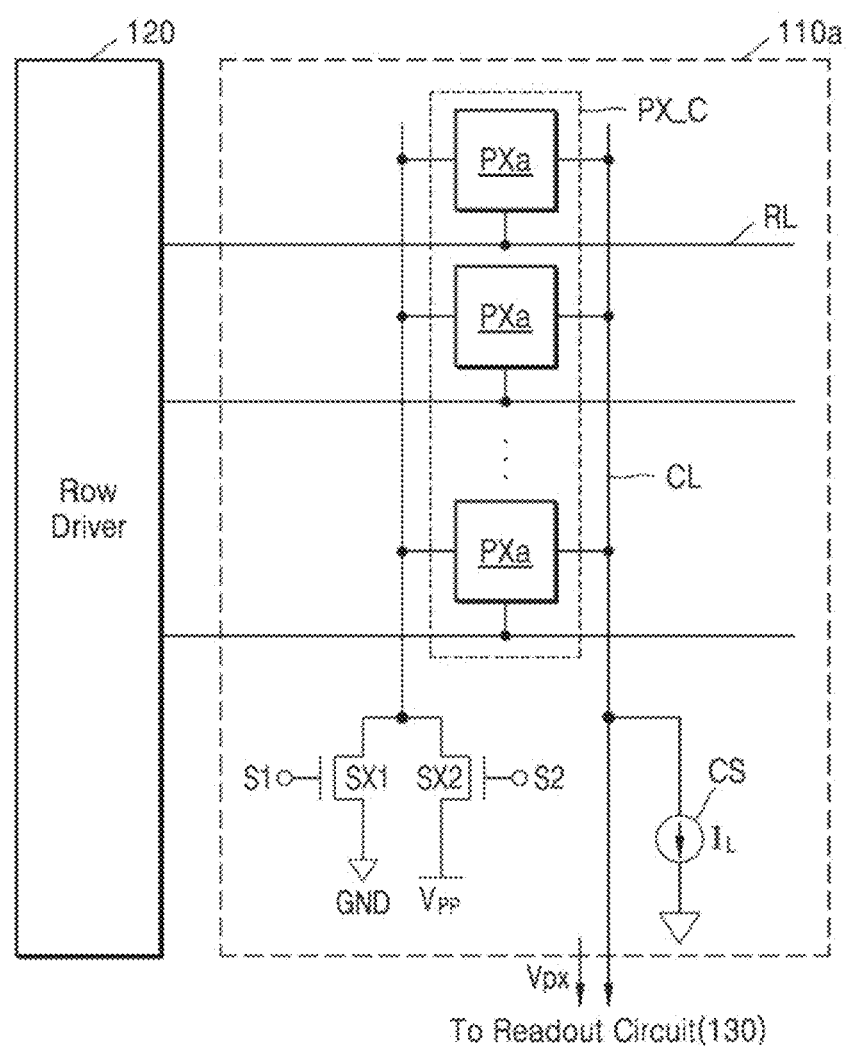
FIG. 10 illustrates a pixel array according to an example embodiment.

FIG. 9 illustrates an example of another pixel according to an example embodiment, and FIG. 10 illustrates a pixel array according to an example embodiment.

Referring to FIG. 9, the pixel PX may include a photoelectric conversion device PE and a pixel circuit PXCa, and the pixel circuit PXCa may include the floating diffusion node FD, an amplifier AMPa, and the reset switching device, for example, the reset transistor RX.

The pixel PXa of FIG. 9 is a modified example of the pixel PX of FIG. 2, and thus, repeated descriptions of like elements thereof will be omitted for conciseness and differences from the pixel PX of FIG. 2 will be mainly described.

Referring to FIGS. 2 and 9, the first selection transistor SX1 and the second selection transistor SX2 may be arranged outside the pixel PXa. Because the first power supply voltage $V_{PP}$ and the second power supply voltage GND are respectively connected to the second selection transistor SX2 and the first selection transistor SX1, even when the first selection transistor SX1 and the second selection transistor SX2 are arranged outside the pixel PXa, the settling time is not significantly increased.

In some embodiments, as shown in FIG. 10, the first selection transistor SX1 and the second selection transistor SX2 may be shared by a plurality of pixels PX_C connected to the same column line CL.

Figure 11A:
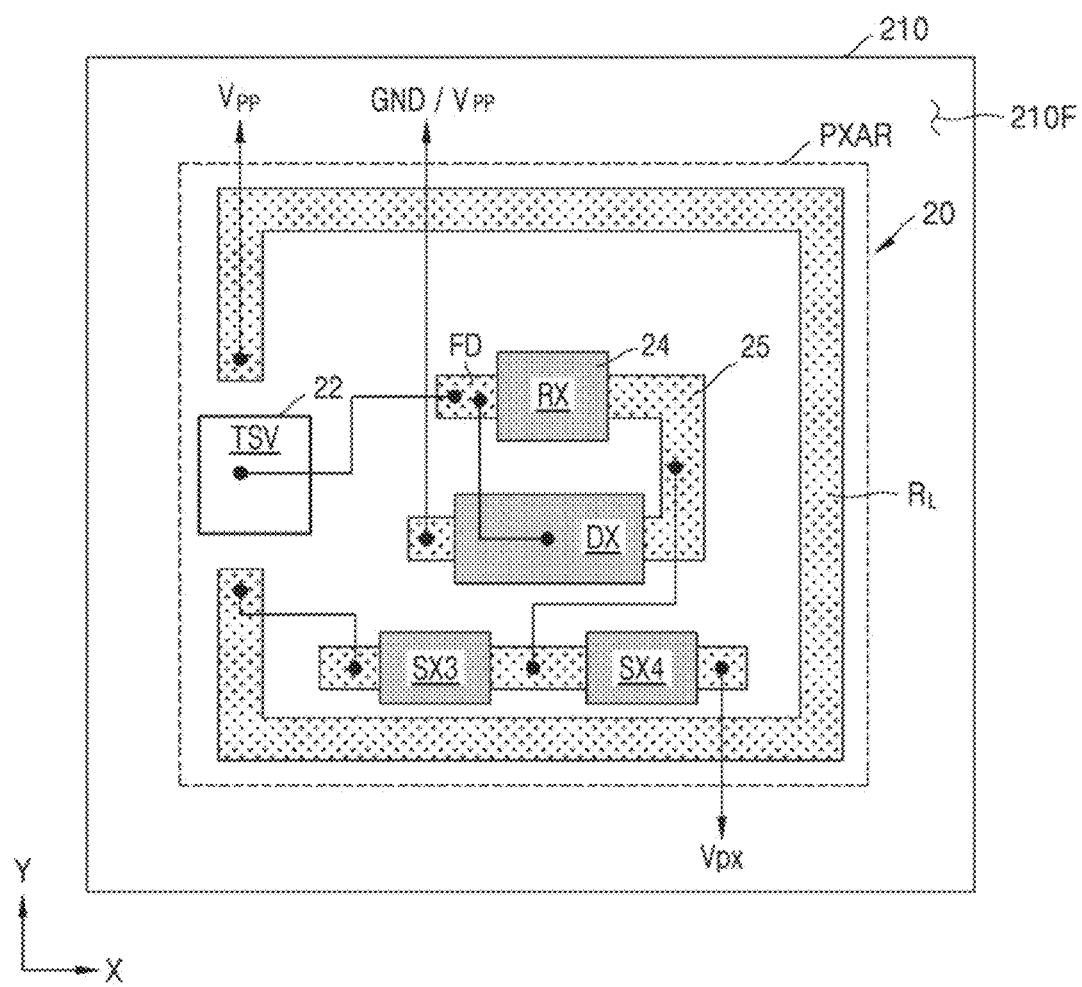
FIGS. 11A and 11B are each a schematic plan view of a pixel according to an example embodiment.
Figure 11B:
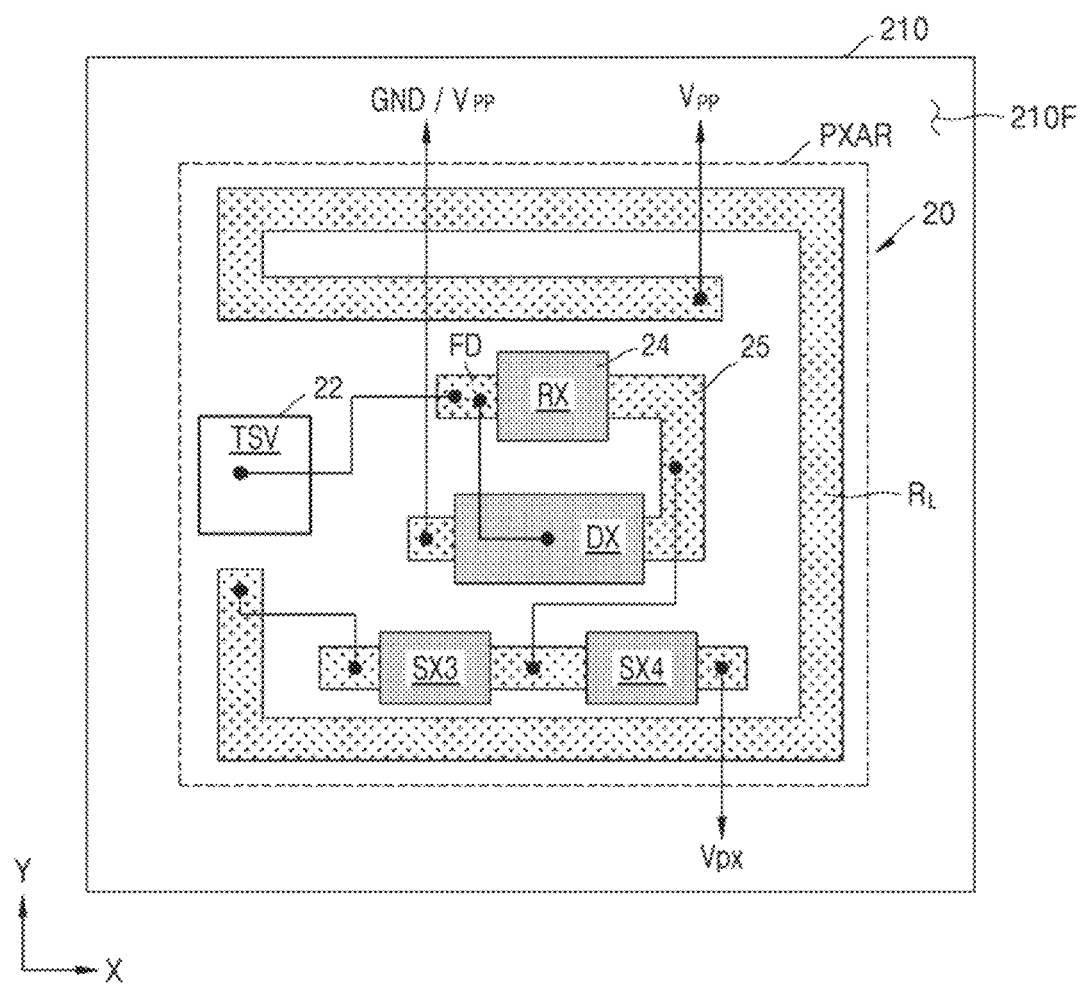

FIGS. 11A and 11B are each a schematic plan view of a pixel according to an example embodiment. Specifically, FIGS. 11A and 11B each illustrate a schematic physical layout of the pixel circuit PXCa of FIG. 9.

Referring to FIGS. 11A and 11B, in the pixel area PXAR of the substrate 210, the floating diffusion node FD, the source/drain 25, the gate 24, and the load resistor $R_L$, may be arranged, and the through-electrode (TSV) 22 may also be arranged.

The source/drain 25 and the gate 24 may constitute a transistor, for example, the reset transistor RX, the driving transistor DX, and the third and fourth selection transistors SX3 and SX4. Unlike the plan views of FIGS. 8A and 8B, the first and second selection transistors SX1 and SX2 are not arranged in the pixel area PXAR. Accordingly, the size of the pixel area PXAR may be reduced. Moreover, in some embodiments as shown in FIG. 11B, the load resistor $R_L$, may be formed in a region in which the first and second selection transistors SX1 and SX2 have been arranged in the plan views of FIGS. 8A and 8B. Accordingly, the area in which the load resistor $R_L$, is formed may be increased and the resistance of the load resistor $R_L$ may be increased.

Figure 12A:
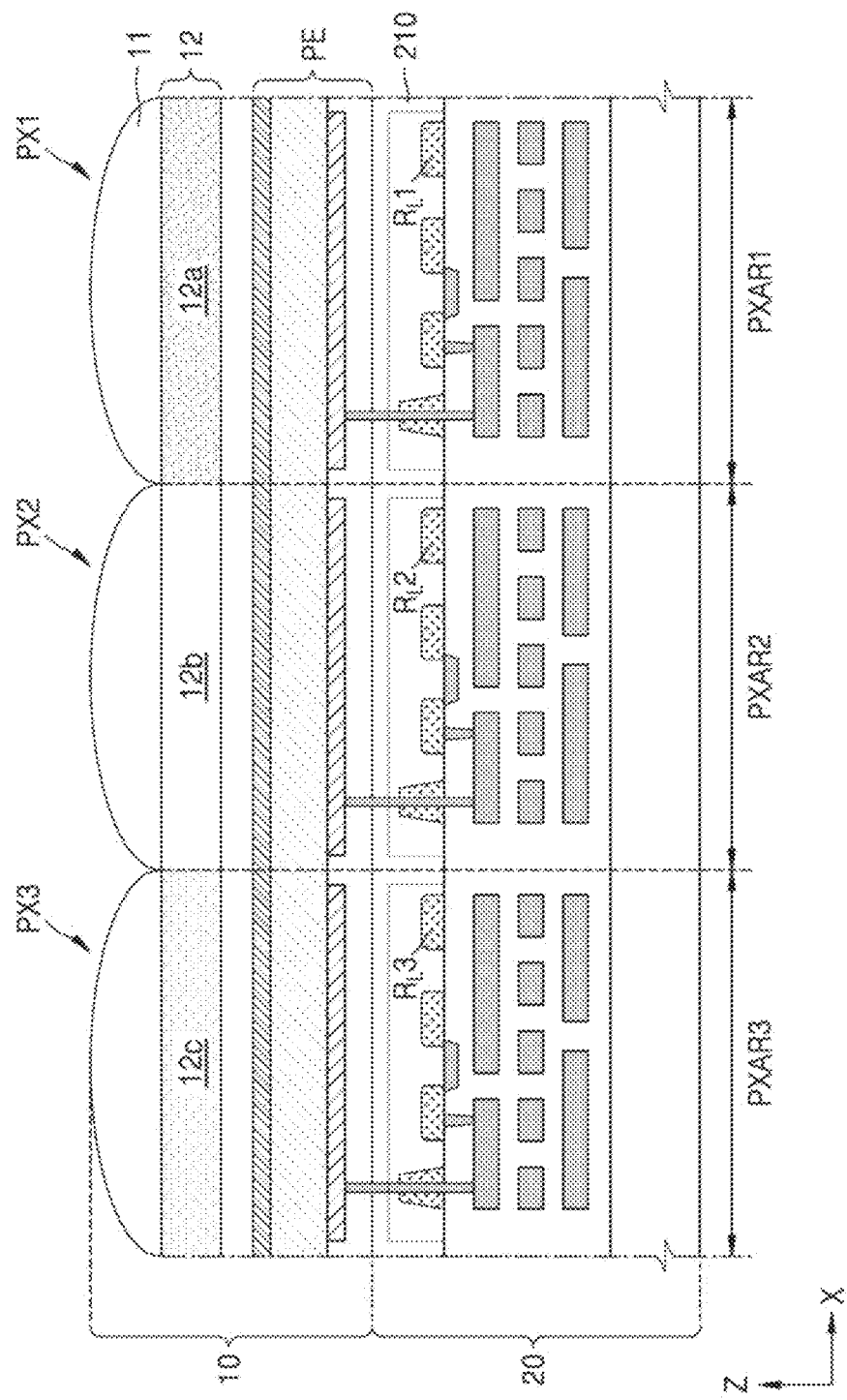
FIGS. 12A to 12C each illustrate a schematic vertical sectional view of a pixel array according to an example embodiment.
Figure 12B:
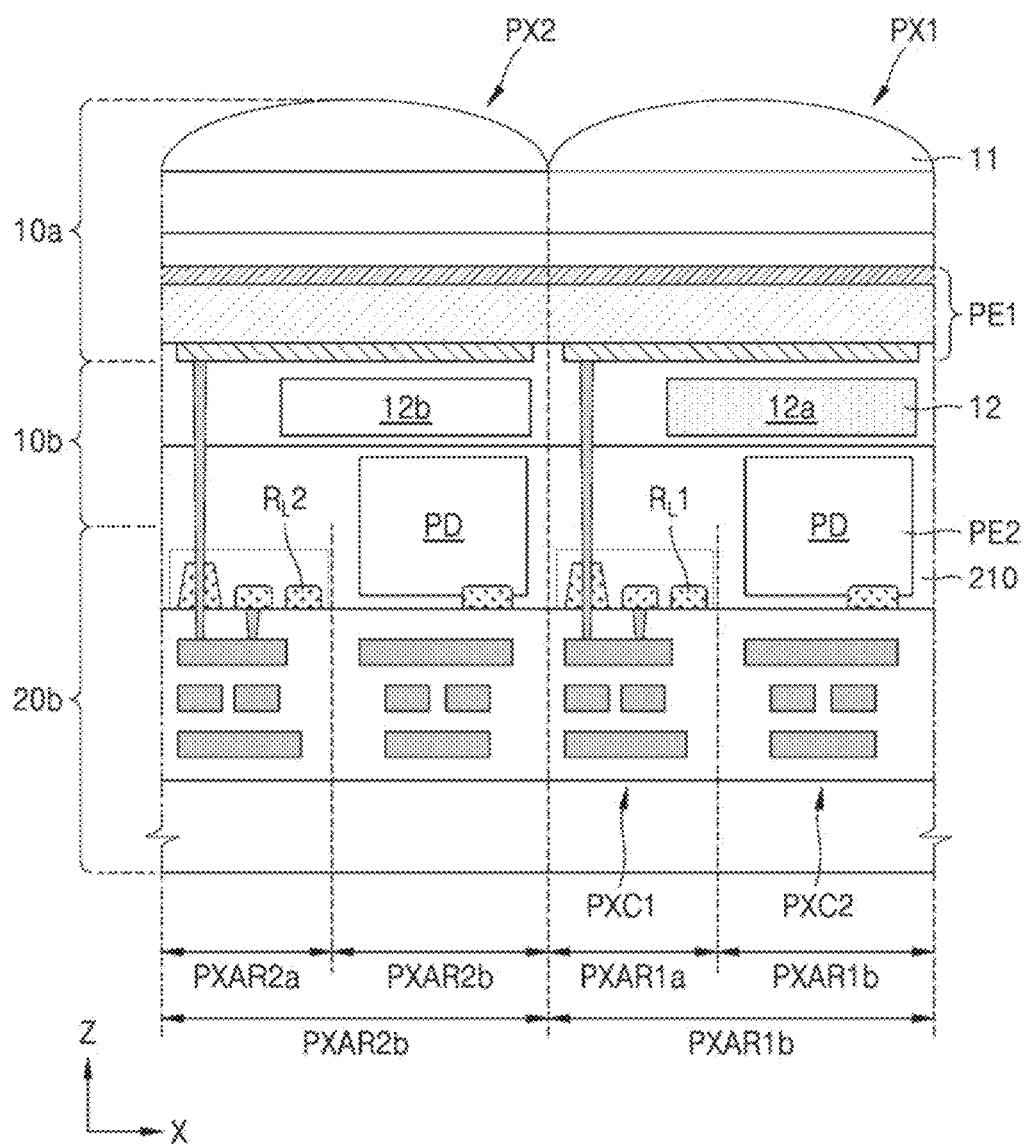
Figure 12C:
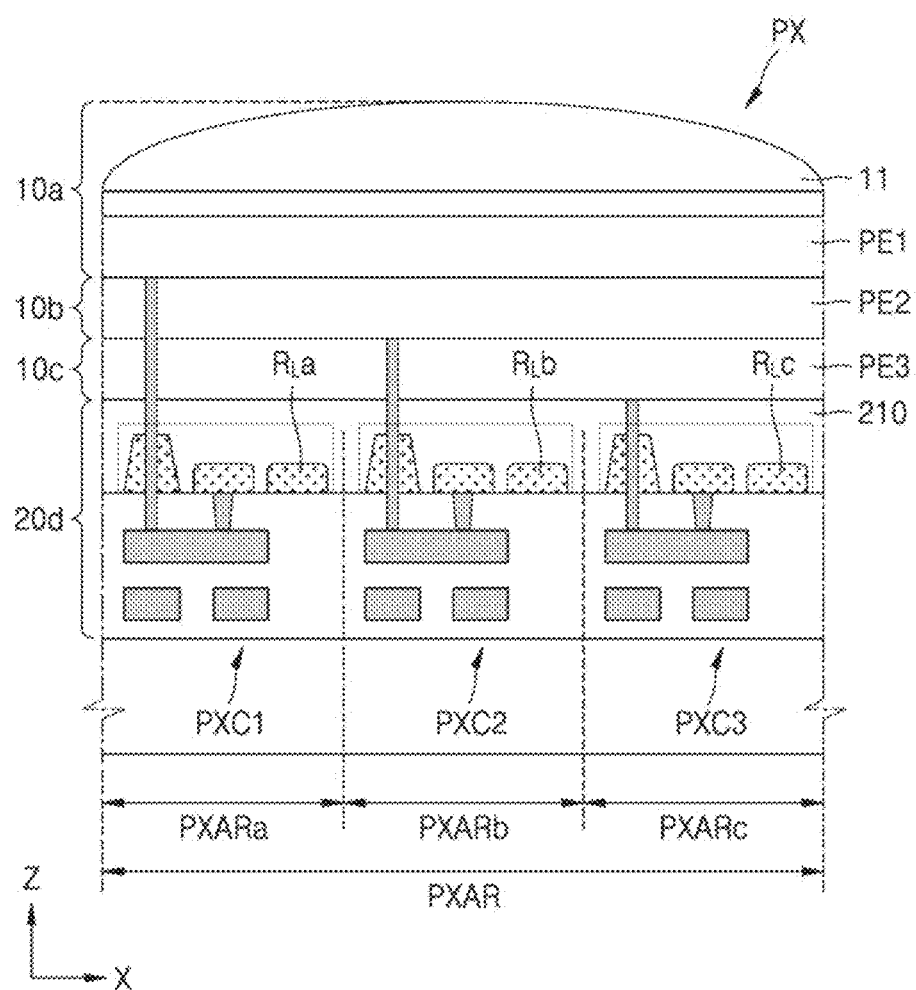

FIGS. 12A to 12C each illustrate a schematic vertical sectional view of a pixel array according to an example embodiment.

Referring to FIG. 12A, a first pixel PX1, a second pixel PX2, and a third pixel PX3 are repeatedly arranged, and each of the first pixel PX1, the second pixel PX2, and the third pixel PX3 may include the photoelectric conversion unit 10 and the pixel circuit unit 20. Because structures of the first pixel PX1, the second pixel PX2, and the third pixel PX3 are similar to the structure of the pixel PX of FIG. 7B, repeated descriptions thereof will be omitted for conciseness.

The first pixel PX1, the second pixel PX2, and the third pixel PX3 may respectively include color filters 12 having different colors.

For example, a first color filter 12a, a second color filter 12b, and a third color filter 12c, which are respectively included in the first pixel PX1, the second pixel PX2, and the third pixel PX3, may respectively correspond to a red color filter, a green color filter, and a blue color filter. Accordingly, the first pixel PX1, the second pixel PX2, and the third pixel PX3 may respectively output sensing signals corresponding to red, green, and blue colors. However, embodiments are not limited thereto, and in some embodiments, the first pixel PX1, the second pixel PX2, and the third pixel PX3 may correspond to another combination of colors. The pixel circuit unit 20 may include a pixel circuit (PXC of FIG. 2 or PXCa of FIG. 9), and load resistors, for example, a first load resistor $R_L1$, a second load resistor $R_L2$, and a third load resistor $R_L3$, which are included in the first pixel PX1, the second pixel PX2, and the third pixel PX3, may be formed in corresponding pixel areas, respectively. For example, the first load resistor $R_L$ 1, the second load resistor $R_L$ 2, and the third load resistor $R_L$ 3 may be respectively formed in regions vertically overlapping a first pixel area PXAR1, a second pixel area PXAR2, and a third pixel area PXAR3 in the substrate 210.

Referring to FIG. 12B, the first pixel PX1 and the second pixel PX2 may be repeatedly arranged, and each of the first pixel PX1 and the second pixel PX2 may have a multilayer structure in which a plurality of photoelectric conversion units, for example, a first photoelectric conversion unit 10a and a second photoelectric conversion unit 10b, are vertically stacked.

The first photoelectric conversion unit 10a of the first pixel PX1 and the second pixel PX2 may include a first photoelectric conversion device PE1, and the first photoelectric conversion device PE1 may include, for example, an organic photodiode. In some embodiments, the first photoelectric conversion device PE1 may convert, into photoelectric charges, a component in a particular color band, for example, a green light signal, among a light signal concentrated by the microlens 11.

The second photoelectric conversion unit 10b of the first pixel PX1 and the second pixel PX2 may include the color filter 12 and a second photoelectric conversion device PE2. In some embodiments, the second photoelectric conversion device PE2 may include a photodiode PD, and the first pixel PX1 and the second pixel PX2 may respectively include color filters 12 having different colors. For example, a first color filter 12a included in the first pixel PX1 may be a red color filter, and a second color filter 12b included in the second pixel PX2 may be a blue color filter. Accordingly, the first pixel PX1 may output sensing signals corresponding to green and red colors, and the second pixel PX2 may output sensing signals corresponding to green and blue colors.

The pixel circuit unit 20b of each of the first pixel PX1 and the second pixel PX2 may include a first pixel circuit PXC1 and a second pixel circuit PXC2 respectively corresponding to the first photoelectric conversion unit 10a and the second photoelectric conversion unit 10b. The first pixel circuit PXC1 may be implemented by the pixel circuit PXC of FIG. 2 or the pixel circuit PXCa of FIG. 9 and may be formed in first pixel areas PXAR1a and PXAR2a in pixel areas PXAR1 and PXAR2 of the first pixel PX1 and the second pixel PX2, respectively. Load resistors, for example, a first load resistor $R_L1$ and a second load resistor $R_L2$, may be respectively formed in regions vertically overlapping the first pixel areas PXAR1a and PXAR2a in the substrate 120.

The second pixel circuit PXC2 may be the same as or different from the first pixel circuit PXC1. When the second pixel circuit PXC2 is the same as the first pixel circuit PXC1, the load resistors may be respectively formed in second pixel areas PXAR1b and PXAR2b of the first and second pixels PX1 and PX2.

Referring to FIG. 12C, the pixel PX may be repeatedly arranged, and the pixel PX may have a multilayer structure in which a plurality of photoelectric conversion units, for example, the first photoelectric conversion unit 10a, the second photoelectric conversion unit 10b, and a third photoelectric conversion unit 10c are vertically stacked.

Each of the first photoelectric conversion unit 10a, the second photoelectric conversion unit 10b, and the third photoelectric conversion unit 10c may be implemented by an organic photodiode and may convert a light signal in a different color band into photoelectric charges. Accordingly, the pixel PX may output sensing signals corresponding to three colors.

A pixel circuit unit 20d may include the first pixel circuit PXC1, the second pixel circuit PXC2, and a third pixel circuit PXC3 respectively corresponding to the first photoelectric conversion unit 10a, the second photoelectric conversion unit 10b, and the third photoelectric conversion unit 10c. Accordingly, the pixel PX may output sensing signals corresponding to three colors.

At least one of the first pixel circuit PXC1, the second pixel circuit PXC2, and the third pixel circuit PXC3 may be implemented by the pixel circuit PXC of FIG. 2 or the pixel circuit PXCa of FIG. 9 and may be formed in a corresponding pixel area among first to third pixel areas PXARa, PXARb, and PXARc included in the pixel area PXAR of the pixel PX. In some embodiments, the first pixel circuit PXC1, the second pixel circuit PXC2, and the third pixel circuit PXC3 may be implemented by the pixel circuit PXC of FIG. 2 or the pixel circuit PXCa of FIG. 9, and load resistors, for example, load resistors $R_L a$, $R_L b$, and $R_L c$, which are respectively included in the first pixel circuit PXC1, the second pixel circuit PXC2, and the third pixel circuit PXC3, may be respectively formed in regions vertically overlapping the first to third pixel areas PXARa, PXARb, and PXARc in the substrate 120.

Figure 13A:
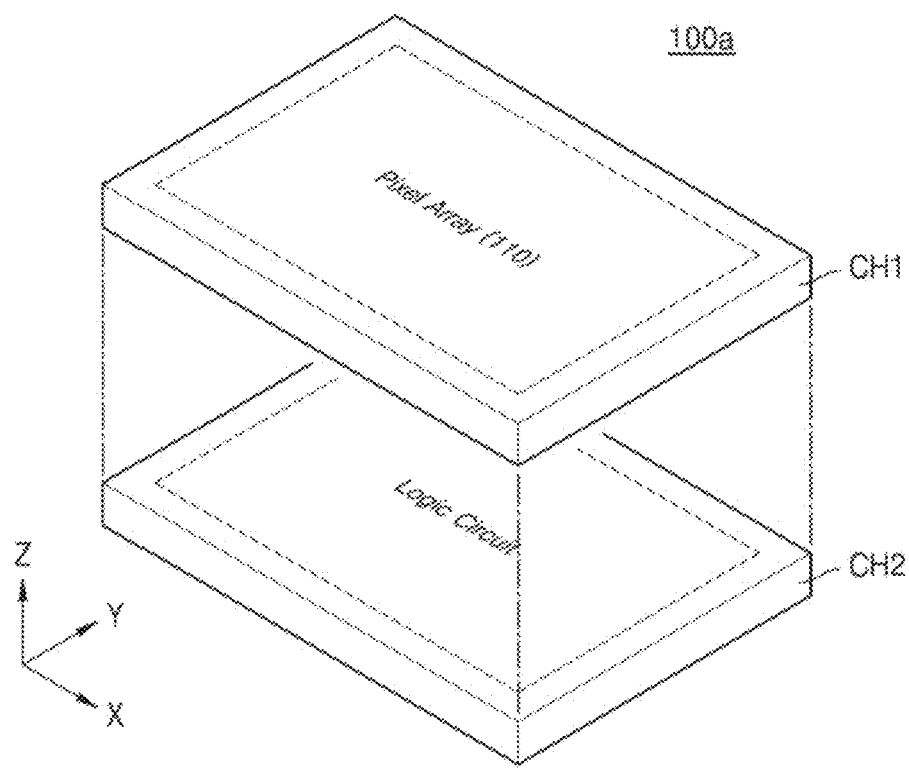
FIG. 13A is an exploded perspective view of an image sensor.
Figure 13B:
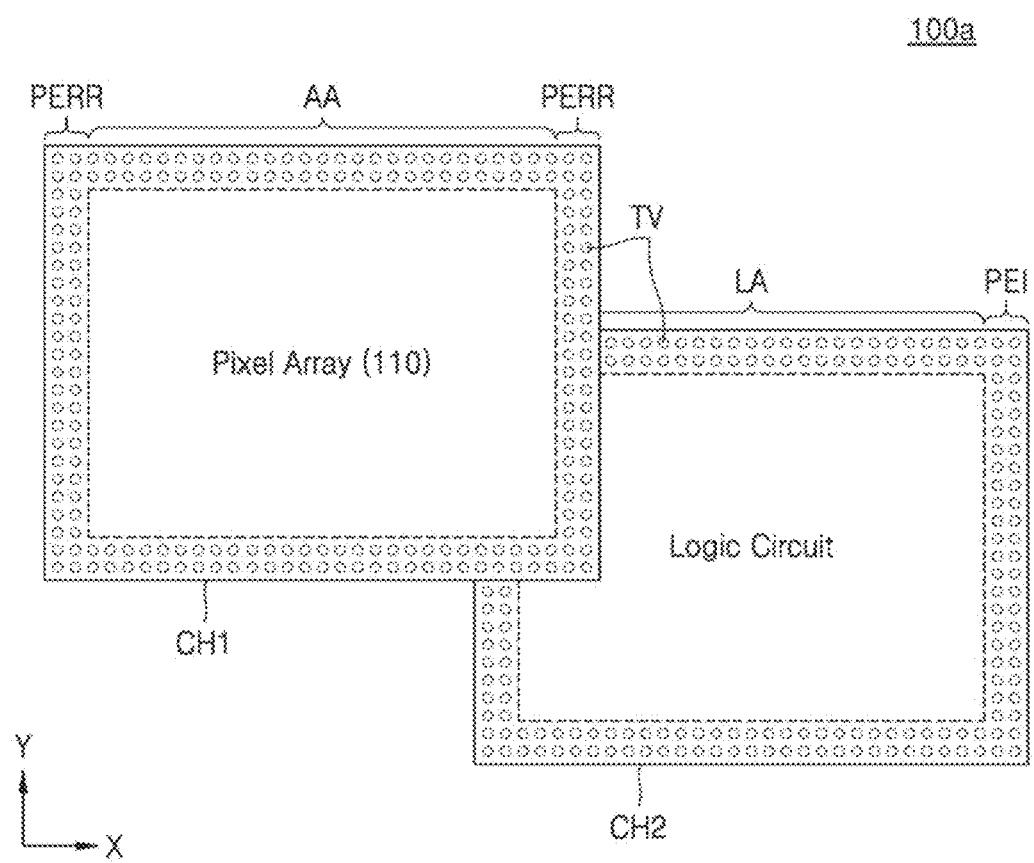
FIG. 13B is a plan view of an image sensor.

FIGS. 13A and 13B illustrate a stack structure of an image sensor according to an example embodiment.

FIG. 13A is an exploded perspective view of the image sensor, and FIG. 13B is a plan view of the image sensor.

Referring to FIGS. 13A and 13B, an image sensor 100a may have a structure in which a first chip CH1 and a second chip CH2 are stacked. In the first chip CH1, a pixel core (for example, at least one photoelectric conversion device PE and at least one pixel circuit PXC) of each of the plurality of pixels PX included in the pixel array (110 of FIG. 1) may be formed, and in the second chip CH2, a logic circuit, for example, the row driver 120, the readout circuit 130, the ramp signal generator 140, and the timing controller 150, may be formed.

As shown in FIG. 13B, the first chip CH1 and the second chip CH2 may respectively include an active area AA and a logic area LA, which are arranged in central regions thereof, and may also respectively include peripheral areas PERR and PEI arranged in outer regions thereof. In the active area AA of the first chip CH1, the photoelectric conversion devices PE and the pixel circuits PXC may be arranged in a 2-dimensional array structure. In the logic area LA of the second chip CH2, the logic circuit may be arranged.

In the peripheral areas PERR and PEI of the first chip CH1 and the second chip CH2, through-vias TV may be arranged to extend in a third direction (Z direction). The first chip CH1 and the second chip CH2 may be electrically coupled to each other via the through-vias TV. In the peripheral area PERR of the first chip CH1, wiring lines extending in a first direction (X direction) or a second direction (Y direction) and vertical contacts may be further formed. In a wiring layer of the second chip CH2, a large number of wiring lines extending in the first direction (X direction) and the second direction (Y direction) may also be arranged, and these wiring lines may be connected to the logic circuit.

Although the structure, in which the first chip CH1 is electrically coupled to the second chip CH2 via the through-vias TV, has been described, embodiments are not limited thereto, and in some embodiments, for example, the electrical coupling of the first chip CH1 and the second chip CH2 may be implemented by various coupling structures such as Cu—Cu bonding, coupling of a through-via and a Cu pad, coupling of a through-via and an external connection terminal, or coupling through an integral through-via.

Figure 14:
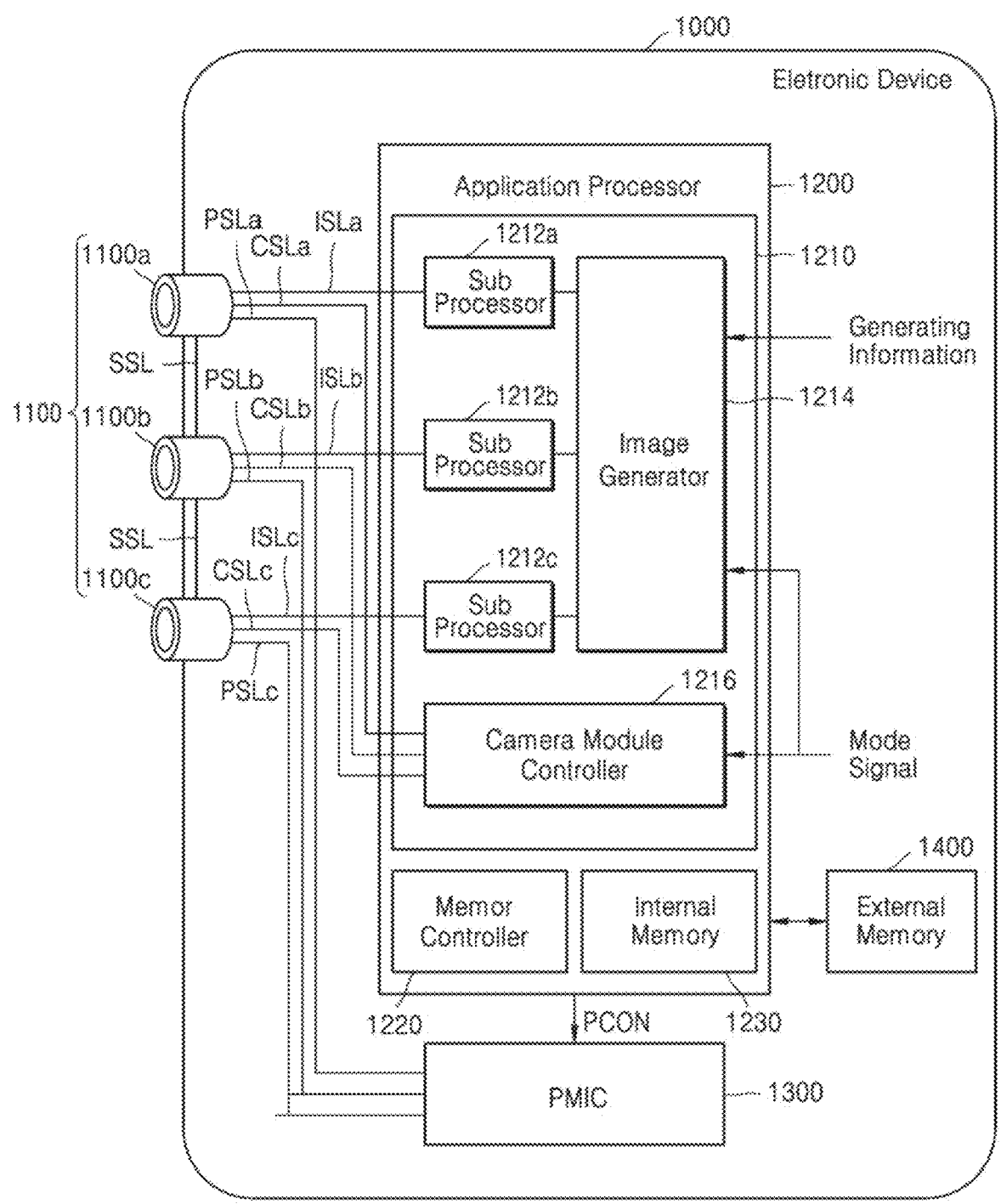
FIG. 14 is a block diagram of an electronic device including a multi-camera module, to which an image sensor according to an example embodiment is applied.
Figure 15:
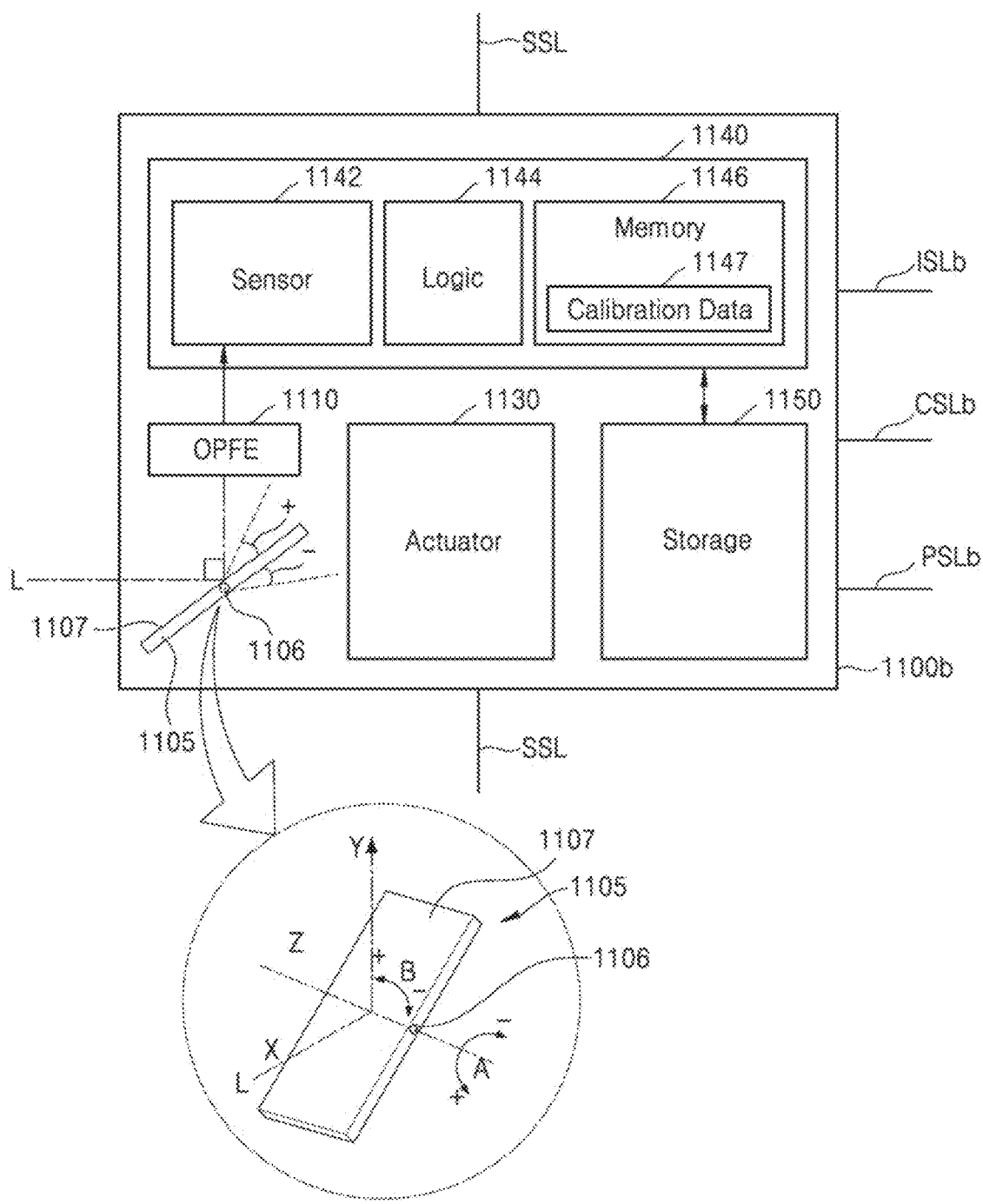
FIG. 15 is a detailed block diagram of the multi-camera module of FIG. 14, according to an example embodiment.

FIG. 14 is a block diagram of an electronic device including a multi-camera module, to which an image sensor according to an example embodiment is applied. FIG. 15 is a detailed block diagram of the multi-camera module of FIG. 14, according to an embodiment.

Referring to FIG. 14, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although FIG. 14 illustrates an embodiment in which three camera modules 1100a, 1100b, and 1100c are arranged, embodiments are not limited thereto. In some embodiments, the camera module group 1100 may be modified to include only two camera modules. In addition, in some embodiments, the camera module group 1100 may be modified to include n camera modules (where n is a natural number of 4 or more).

Hereinafter, although a configuration of the camera module 1100b will be described in more detail with reference to FIG. 15, the following description may also be equally applied to the other camera modules 1100a and 1100c according to embodiments.

Referring to FIG. 15, the camera module 1100b may include a prism 1105, an optical path folding element (OPFE) 1110, an actuator 1130, an image sensing device 1140, and storage 1150.

The prism 1105 may include a reflective surface 1107 of a light reflection material and thus may change a path of light L that is incident from outside thereof.

In some embodiments, the prism 1105 may change the path of light L incident in the first direction (X direction) into the second direction (Y direction) that is perpendicular to the first direction (X direction). In addition, the prism 1105 may change the path of light L incident in the first direction (X direction) into the second direction (Y direction) perpendicular to the first direction by rotating the reflective surface 1107 of the light reflection material about a central axis 1106 in an A direction or by rotating the central axis 1106 in a B direction. Here, the OPFE 1110 may also be moved in the third direction (Z direction) that is perpendicular to the first direction (X direction) and the second direction (Y direction).

In some embodiments, as shown in FIG. 15, although the prism 1105 may have a maximum rotation angle of 15 degrees or less in a plus (+) A direction and have a maximum rotation angle greater than 15 degrees in a minus (−) A direction, embodiments of the inventive concept are not limited thereto.

In some embodiments, the prism 1105 may be moved in a + or − B direction by as much as about 20 degrees, about 10 degrees to about 20 degrees, or about 15 degrees to about 20 degrees, and here, the maximum moving angle in the + B direction may be equal to the maximum moving angle in the − B direction or may be similar to the maximum moving angle in the − B direction with a difference of about 1 degree therebetween.

In some embodiments, the prism 1105 may move the reflective surface 1107 of the light reflection material in the third direction (for example, the Z direction) parallel to an extension direction of the central axis 1106.

The OPFE 1110 may include an optical lens including a group of m optical lenses (where m is a natural number). The m optical lenses may change an optical zoom ratio of the camera module 1100b by moving in the second direction (Y direction). For example, assuming that a basic optical zoom ratio of the camera module 1100b is Z, when the m optical lenses included in the OPFE 1110 are moved, the optical zoom ratio of the camera module 1100b may be changed to 3Z, 5Z, or 5Z or more.

The actuator 1130 may move the OPFE 1110 or the optical lens to a particular position. For example, the actuator 1130 may adjust a position of the optical lens such that an image sensor 1142 is located at a position corresponding to a focal length of the optical lens, for accurate sensing.

The image sensing device 1140 may include the image sensor 1142, a control logic 1144, and a memory 1146. The image sensor 1142 may sense an image of a sensing object by using light L provided through the optical lens. The image sensor 1142 may be the image sensor of one of the above-described embodiments. According to the above-described image sensor (e.g., the image sensor 100 of FIG. 1) according to various example embodiments, because each of the plurality of pixels included in the pixel array performs the feedback reset operation, the rest noise may be reduced, and because the load device, which provides the bias current to the feedback amplifier operating upon the feedback reset, is arranged inside the pixel, the reset time may be reduced.

The control logic 1144 may control overall operations of the camera module 1100b. For example, the control logic 1144 may control an operation of the camera module 1100b according to a control signal provided through a control signal line CSLb.

The memory 1146 may store information required for the operation of the camera module 1100b, such as calibration data 1147. The calibration data 1147 may include information used by the camera module 1100b to generate image data by using light L provided from outside thereof. The calibration data 1147 may include, for example, information about the degree of rotation, which has been described above, information about the focal length, information about the optical axis, and the like. When the camera module 1100b is implemented by a multi-state camera in which the focal length varies with the position of the optical lens, the calibration data 1147 may include a value of the focal length for each position (or for each state) of the optical lens and information related to auto-focusing.

The storage 1150 may store image data sensed by the image sensor 1142. The storage 1150 may be arranged outside the image sensing device 1140 and may be implemented in a manner in which the storage 1150 and a sensor chip constituting the image sensing device 1140 are stacked. In some embodiments, although the storage 1150 may be implemented by electrically erasable programmable read-only memory (EEPROM), embodiments are not limited thereto.

Referring together to FIGS. 14 and 15, in some embodiments, each of the plurality of camera modules 1100a, 1100b, and 1100c may include the actuator 1130. Accordingly, each of the plurality of camera modules 1100a, 1100b, and 1100c may include the same or different calibration data 1147 according to an operation of the actuator 1130 included therein.

In some embodiments, among the plurality of camera modules 1100a, 1100b, and 1100c, one camera module (for example, 1100b) may be a folded lens type camera module including the prism 1105 and the OPFE 1110, which have been described above, and the remaining camera modules (for example, 1100a and 1100b) may be a vertical type camera module not including the prism 1105 and the OPFE 1110, although embodiments are not limited thereto.

In some embodiments, among the plurality of camera modules 1100a, 1100b, and 1100c, one camera module (for example, 1100c) may be, for example, a vertical type depth camera which extracts depth information by using infrared rays (IR). In this case, the application processor 1200 may generate a 3-dimensional (3D) depth image by merging image data provided by such a depth camera with image data provided by another camera module (for example, 1100a or 1100b).

In some embodiments, among the plurality of camera modules 1100a, 1100b, and 1100c, at least two camera modules (for example, 1100a and 1100b) may have different fields of view from each other. In this case, for example, although optical lenses of the at least two camera modules (for example, 1100a and 1100b) among the plurality of camera modules 1100a, 1100b, and 1100c may be different from each other, the inventive concept is not limited thereto.

In addition, in some embodiments, the plurality of camera modules 1100a, 1100b, and 1100c may respectively have different fields of view. In this case, although optical lenses respectively included in the plurality of camera modules 1100a, 1100b, and 1100c may also be different from each other, embodiments are not limited thereto.

In some embodiments, the plurality of camera modules 1100a, 1100b, and 1100c may be arranged to be physically separated from each other. That is, the plurality of camera modules 1100a, 1100b, and 1100c do not divide and use a sensing area of the image sensor 1142, but the image sensor 1142 may be independently arranged inside each of the plurality of camera modules 1100a, 1100b, and 1100c.

Referring again to FIG. 14, the application processor 1200 may include an image processing device 1210, a memory controller 1220, and an internal memory 1230. The application processor 1200 may be implemented separately from the plurality of camera modules 1100a, 1100b, and 1100c. For example, the application processor 1200 and the plurality of camera modules 1100a, 1100b, and 1100c may be implemented by semiconductor chips separate from each other.

The image processing device 1210 may include a plurality of sub-image processors 1212a, 1212b, and 1212c, an image generator 1214, and a camera module controller 1216.

The image processing device 1210 may include the plurality of sub-image processors 1212a, 1212b, and 1212c by as many as a number corresponding to the number of camera modules 1100a, 1100b, and 1100c.

Pieces of image data generated by the camera modules 1100a, 1100b, and 1100c may be respectively provided to the corresponding sub-image processors 1212a, 1212b, and 1212c through image signal lines ISLa, ISLb, and ISLc separate from each other. For example, image data generated by the camera module 1100a may be provided to the sub-image processor 1212a through the image signal line ISLa, image data generated by the camera module 1100b may be provided to the sub-image processor 1212b through the image signal line ISLb, and image data generated by the camera module 1100c may be provided to the sub-image processor 1212c through the image signal line ISLc. Although such image data transmission may be performed by using, for example, a mobile industry processor interface (MIPI)-based camera serial interface (CSI), embodiments are not limited thereto.

In some embodiments, one sub-image processor may be arranged to correspond to a plurality of camera modules. For example, the sub-image processor 1212a and the sub-image processor 1212c may be implemented to be integrated into one sub-image processor rather than implemented separately from each other as shown in FIG. 14, and the pieces of image data provided by the camera module 1100a and the camera module 1100c may be selected by a selection device (for example, a multiplexer) or the like and then provided to the integrated sub-image processor.

The image data provided to each of the sub-image processors 1212a, 1212b, and 1212c may be provided to the image generator 1214. The image generator 1214 may generate an output image by using the image data provided by each of the sub-image processors 1212a, 1212b, and 1212c, according to image generating information or a mode signal.

Specifically, according to the image generating information or the mode signal, the image generator 1214 may generate the output image by merging at least some of the pieces of image data respectively generated by the camera modules 1100a, 1100b, and 1100c having different fields of view from each other. In addition, according to the image generating information or the mode signal, the image generator 1214 may generate the output image by selecting one of the pieces of image data respectively generated by the camera modules 1100a, 1100b, and 1100c having different fields of view from each other.

In some embodiments, the image generating information may include a zoom signal (or zoom factor). In addition, in some embodiments, the mode signal may be, for example, a signal that is based on a mode selected by a user.

When the image generating information is the zoom signal (zoom factor) and the camera modules 1100a, 1100b, and 1100c respectively have different fields of view, the image generator 1214 may perform a different operation according to the type of zoom signal. For example, when the zoom signal is a first signal, the image data output from the camera module 1100a is merged with the image data output from the camera module 1100c, and then, the output image may be generated by using the merged image signal and the image data that is output from the camera module 1100b and not used for the merging. When the zoom signal is a second signal that is different from the first signal, the image generator 1214 does not perform such image data merging and may generate the output image by selecting one of the pieces of image data respectively output from the camera modules 1100a, 1100b, and 1100c. However, embodiments are not limited thereto, and the method of processing image data may be modified in any manner and implemented, as needed.

In some embodiments, the image generator 1214 may receive a plurality of pieces of image data, which have different exposure times from each other, from at least one of the plurality of sub-image processors 1212a, 1212b, and 1212c and perform high dynamic range (HDR) processing on the plurality of pieces of image data, thereby generating merged image data having an increased dynamic range.

The camera module controller 1216 may provide a control signal to each of the camera modules 1100a, 1100b, and 1100c. The control signal generated by the camera module controller 1216 may be respectively provided to the corresponding camera modules 1100a, 1100b, and 1100c through the control signal lines CSLa, CSLb, and CSLc separate from each other.

One of the plurality of camera modules 1100a, 1100b, and 1100c may be designated as a master camera (for example, 1100b) according to the image generating information including the zoom signal or according to the mode signal, and the remaining camera modules (for example, 1100a and 1100c) may be designated as slave cameras. Such information may be included in the control signal and respectively provided to the corresponding camera modules 1100a, 1100b, and 1100c through the control signal lines CSLa, CSLb, and CSLc separate from each other.

The camera modules operated as a master and a slave may vary with the zoom factor or the operation mode signal. For example, when the camera module 1100a has a broader field of view than that of the camera module 1100b and has a low zoom factor, the camera module 1100b may be operated as a master, and the camera module 1100a may be operated as a slave. On the contrary, when the camera module 1100a has a high zoom factor, the camera module 1100a may be operated as a master, and the camera module 1100b may be operated as a slave.

In some embodiments, the control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit the sync enable signal to the camera module 1100b. The camera module 1100b provided with the sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized by the sync signal and thus may transmit the pieces of image data to the application processor 1200.

In some embodiments, the control signal provided from the camera module controller 1216 to each of the camera modules 1100a, 1100b, and 1100c may include mode information according to the mode signal. The plurality of camera modules 1100a, 1100b, and 1100c may be operated in a first operation mode and a second operation mode in relation to a sensing rate, based on the mode information.

In the first operation mode, each of the plurality of camera modules 1100a, 1100b, and 1100c may generate an image signal at a first rate (for example, generate an image signal having a first frame rate), encode the image signal at a second rate that is higher than the first rate (for example, encode the image signal into an image signal having a second frame rate that is higher than the first frame rate), and transmit the encoded image signal to the application processor 1200. Here, the second rate may be 30 or less times the first rate.

The application processor 1200 may store the received image signal, that is, the encoded image signal, in the memory 1230 included therein or in the storage 1400 external to the application processor 1200, followed by reading the encoded image signal from the memory 1230 or the storage 1400 and decoding the read image signal, and then, may display image data generated based on the decoded image signal. For example, a corresponding sub-image processor among the plurality of sub-image processors 1212a, 1212b, and 1212c of the image processing device 1210 may perform decoding and may perform image processing on the decoded image signal.

In the second operation mode, each of the plurality of camera modules 1100a, 1100b, and 1100c may generate an image signal at a third rate that is lower than the first rate (for example, generate an image signal having a third frame rate that is lower than the first frame rate) and may transmit the image signal to the application processor 1200. The image signal provided to the application processor 1200 may be a signal that is not encoded. The application processor 1200 may perform image processing on the received image signal or may store the image signal in the memory 1230 or the storage 1400.

The PMIC 1300 may provide power, for example, a supply voltage, to each of the plurality of camera modules 1100a, 1100b, and 1100c. For example, under the control of the application processor 1200, the PMIC 1300 may supply first power to the camera module 1100a through a power signal line PSLa, supply second power to the camera module 1100b through a power signal line PSLb, and supply third power to the camera module 1100c through a power signal line PSLc.

In response to a power control signal PCON from the application processor 1200, the PMIC 1300 may generate power corresponding to each of the plurality of camera modules 1100a, 1100b, and 1100c and adjust a level of the power. The power control signal PCON may include a power adjustment signal for each operation mode of the plurality of camera modules 1100a, 1100b, and 1100c. For example, the operation mode may include a low power mode, and here, the power control signal PCON may include information about a camera module operated in the lower power mode and about a power level set in the lower power mode. Levels of pieces of power respectively provided to the plurality of camera modules 1100a, 1100b, and 1100c may be equal to or different from each other. In addition, the level of the power may be dynamically changed.

While various example embodiments have been particularly shown and described with reference to the accompanying drawings, it will be understood that various changes in form and details may be made therein without departing from the spirit and scope of the following claims.

What is claimed is:

1. An image sensor comprising a plurality of pixels arranged in a matrix form and converting a light signal into an electrical signal, each of the plurality of pixels comprising:
    a photoelectric conversion device configured to convert the light signal into electric charges;
    a floating diffusion node, which is connected to the photoelectric conversion device and stores the electric charges;
    an amplifier configured to inversion-amplify a voltage of the floating diffusion node, output, in a reset period, a first output signal through a first node based on the inversion-amplified voltage, and output, in a signal output period, a second output signal through a second node different from the first node based on the inversion-amplified voltage; and
    a reset switching device configured to be turned on in the reset period and provide the first output signal of the amplifier to the floating diffusion node,
    wherein the amplifier comprises a load device configured to provide a first bias current in the reset period.

2. The image sensor of claim 1, wherein the plurality of pixels are arranged, respectively, in a plurality of pixel areas, and
    the floating diffusion node, the amplifier, and the load device, which are included in one pixel of the plurality of pixels, are arranged in a pixel area corresponding to the one pixel from among the plurality of pixel areas.

3. The image sensor of claim 2, wherein the image sensor further comprises a substrate, and
    the load device included in the one pixel comprises a well resistor provided in the substrate and arranged in a region of the substrate that vertically overlaps the pixel area corresponding to the one pixel.

4. The image sensor of claim 3, wherein the well resistor is arranged adjacent to at least one of four lateral sides of the region.

5. The image sensor of claim 3, wherein the well resistor is arranged along a lateral side of the region.

6. The image sensor of claim 1, wherein the amplifier is further configured to generate the second output signal based on a second bias current, in the signal output period, and
    the second output signal is provided to an analog-digital conversion circuit through a column line.

7. The image sensor of claim 1, wherein the amplifier comprises a reset transistor, a driving transistor, and a plurality of selection transistors, and
    one end of the reset transistor and a gate terminal of the driving transistor are connected to the floating diffusion node.

8. The image sensor of claim 7, wherein a pixel driving voltage or a ground voltage is applied to a first terminal of the driving transistor, and another end of the reset transistor is connected to a second terminal of the driving transistor.

9. The image sensor of claim 1, wherein the photoelectric conversion device comprises an organic photodiode.

10. A pixel array of an image sensor, the pixel array comprising:
    a plurality of pixels, each of the plurality of pixels comprising:
        a microlens;
        a first photoelectric conversion device arranged under the microlens and configured to generate first photoelectric charges from a light signal incident thereon; and
        a first pixel circuit arranged in a pixel area vertically overlapping the microlens and vertically under the first photoelectric conversion device, the first pixel circuit being configured to output a first sensing signal based on an amount of the first photoelectric charges,
    wherein the first pixel circuit comprises:
        a floating diffusion node that stores the first photoelectric charges;
        an amplifier comprising a plurality of switching devices, the amplifier being configured to amplify a voltage of the floating diffusion node; and
        a resistor device configured to provide a bias current to the amplifier in a reset period.

11. The pixel array of claim 10, wherein the pixel array comprises a substrate including a plurality of pixel areas respectively corresponding to the plurality of pixels, and
    wherein the first pixel circuit is arranged in the pixel area in the substrate that corresponds to a pixel of the first pixel circuit, and
    the resistor device of the first pixel circuit is arranged adjacent to a lateral side of the pixel area.

12. The pixel array of claim 11, wherein the resistor device is formed by doping a portion of a p-type well region in the pixel area with n-type impurities.

13. The pixel array of claim 10, wherein the resistor device is arranged inside a substrate.

14. The pixel array of claim 10, wherein each of the plurality of pixels further comprises a through-electrode, which connects the first photoelectric conversion device to the floating diffusion node and extends in a direction perpendicular to a substrate.

15. The pixel array of claim 10, wherein the plurality of switching devices comprise:
    a driving transistor, a gate terminal of which is connected to the floating diffusion node;
    a reset transistor including a first terminal connected to a first terminal of the driving transistor and a second terminal connected to the floating diffusion node;
    a first switching transistor including a first terminal connected to one end of the resistor device and a second terminal connected to the first terminal of the driving transistor; and
    a second switching transistor including a first terminal connected to the first terminal of the driving transistor and a second terminal connected to a column line.

16. The pixel array of claim 15, wherein the plurality of switching devices further comprise:
    a third switching transistor having a first terminal connected to a ground voltage and a second terminal connected to a second terminal of the driving transistor; and
    a fourth switching transistor having a first terminal connected to a pixel driving voltage and a second terminal connected to the second terminal of the driving transistor.

17. An image sensor comprising:
    a substrate;
    a pixel array comprising a plurality of pixels, each pixel of the plurality of pixels comprising:
        a pixel circuit formed in a pixel area corresponding to the pixel in the substrate; and
        a pixel conversion device arranged on the substrate to vertically overlap the pixel circuit,
    wherein the pixel circuit comprises:

a floating diffusion node;
a reset switching device; and
an amplifier comprising a load device and a plurality of switching devices,
the load device being arranged in the pixel area.

18. The image sensor of claim 17, wherein the load device is arranged adjacent to at least one of four lateral sides of the pixel area.

19. The image sensor of claim 17, wherein the load device is a well resistor formed by n-type impurities in a p-type well region.

20. The image sensor of claim 17, wherein the plurality of switching devices are arranged in a center of the pixel area and the load device is arranged between the plurality of switching devices and a lateral side of the pixel area.

\* \* \* \* \*